US009684077B2

(12) United States Patent
Mead et al.

(10) Patent No.: US 9,684,077 B2
(45) Date of Patent: *Jun. 20, 2017

(54) FREQUENCY QUADRUPLED LASER USING THULIUM-DOPED FIBER AMPLIFIER AND METHOD

(71) Applicant: Lockheed Martin Corporation, Bethesda, MD (US)

(72) Inventors: Roy D. Mead, Edmonds, WA (US); John D. Minelly, Santa Clara, CA (US); Eric C. Honea, Seattle, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/618,879

(22) Filed: Feb. 10, 2015

(65) Prior Publication Data
US 2015/0219765 A1 Aug. 6, 2015

Related U.S. Application Data

(62) Division of application No. 12/799,982, filed on Apr. 28, 2010, now Pat. No. 8,953,647.

(51) Int. Cl.
*H01S 3/10* (2006.01)
*G01S 17/89* (2006.01)
(Continued)

(52) U.S. Cl.
CPC ............ *G01S 17/89* (2013.01); *G01S 7/4813* (2013.01); *H01S 3/06754* (2013.01);
(Continued)

(58) Field of Classification Search
CPC .... H01S 3/06791; H01S 3/115; H01S 3/1616; G01B 11/2518; G01B 11/28
(Continued)

(56) References Cited

U.S. PATENT DOCUMENTS 3,934,154 A 1/1976 Cook, Jr.
4,867,558 A 9/1989 Leonard et al.
(Continued)

OTHER PUBLICATIONS

Asakawa, Yuichi, et al., "High-power CW DUV coherent light source around 200 nm", 2004, Publisher: Optical Society of America.
(Continued)

*Primary Examiner* — Tod T Van Roy
(74) *Attorney, Agent, or Firm* — Charles A. Lemaire; Jonathon M. Rixen; Lemaire Patent Law Firm, P.L.L.C.

(57) ABSTRACT

An apparatus, method and associated fiber-laser architectures for high-power pulsed operation and pumping wavelength-conversion devices. Some embodiments generate blue laser light by frequency quadrupling infrared (IR) light from Tm-doped gain fiber using non-linear wavelength conversion. Some embodiments use a fiber MOPA configuration to amplify a seed signal from a semiconductor laser or ring fiber laser. Some embodiments use the frequency-quadrupled blue light for underwater communications, imaging, and/or object and anomaly detection. Some embodiments amplitude modulate the IR seed signal to encode communication data sent to or from a submarine once the modulated light has its wavelength quartered. Other embodiments transmit blue-light pulses in a scanned pattern and detect scattered light to measure distances to objects in a raster-scanned underwater volume, which in turn are used to generate a data structure representing a three-dimensional rendition of the underwater scene being imaged for viewing by a person or for other software analysis.

20 Claims, 9 Drawing Sheets

(51) Int. Cl.

| | |
|---|---|
| *H01S 3/067* | (2006.01) |
| *H01S 3/16* | (2006.01) |
| *G01S 7/481* | (2006.01) |
| *H04B 10/80* | (2013.01) |
| *H01S 3/115* | (2006.01) |
| *G01B 11/28* | (2006.01) |
| *G01B 11/25* | (2006.01) |
| *H01S 3/08* | (2006.01) |
| *H01S 3/094* | (2006.01) |
| *H01S 3/107* | (2006.01) |
| *H01S 3/11* | (2006.01) |
| *H01S 3/00* | (2006.01) |

(52) U.S. Cl.
CPC ........... *H01S 3/1616* (2013.01); *H04B 10/80* (2013.01); *H04B 10/808* (2013.01); *G01B 11/2518* (2013.01); *G01B 11/28* (2013.01); *H01S 3/0078* (2013.01); *H01S 3/0092* (2013.01); *H01S 3/06791* (2013.01); *H01S 3/08027* (2013.01); *H01S 3/094003* (2013.01); *H01S 3/107* (2013.01); *H01S 3/11* (2013.01); *H01S 3/115* (2013.01)

(58) Field of Classification Search
USPC .................................................. 372/6, 12, 94
See application file for complete search history.

(56) References Cited

U.S. PATENT DOCUMENTS

| | | | |
|---|---|---|---|
| 4,893,924 A * | 1/1990 | Leonard | G01K 11/12 356/43 |
| 5,091,778 A * | 2/1992 | Keeler | G01S 7/484 348/31 |
| 5,144,630 A | 9/1992 | Lin | |
| 5,216,681 A | 6/1993 | St. Pierre et al. | |
| 5,222,181 A * | 6/1993 | Adams | G01S 7/4814 372/22 |
| 5,260,953 A | 11/1993 | Rowe | |
| 5,270,780 A * | 12/1993 | Moran | G01S 17/89 313/373 |
| 5,281,211 A | 1/1994 | Parel et al. | |
| 5,312,320 A | 5/1994 | L'Esperance, Jr. | |
| 5,343,485 A | 8/1994 | Okazaki | |
| 5,363,388 A | 11/1994 | Shi et al. | |
| 5,408,481 A | 4/1995 | Scheps | |
| 5,423,801 A | 6/1995 | Marshall et al. | |
| 5,430,754 A | 7/1995 | Suzuki et al. | |
| 5,457,707 A | 10/1995 | Sobey et al. | |
| 5,477,378 A | 12/1995 | Johnson | |
| 5,504,719 A | 4/1996 | Jacobs | |
| 5,579,152 A | 11/1996 | Ellingson et al. | |
| 5,633,883 A | 5/1997 | Shi et al. | |
| 5,638,388 A | 6/1997 | Nighan, Jr. et al. | |
| 5,742,626 A | 4/1998 | Mead et al. | |
| 6,002,697 A | 12/1999 | Govorkov et al. | |
| 6,288,835 B1 | 9/2001 | Nilsson et al. | |
| 6,590,698 B1 | 7/2003 | Ohtsuki et al. | |
| 6,680,956 B2 | 1/2004 | Gerstenberger et al. | |
| 6,735,234 B1 | 5/2004 | Paschotta et al. | |
| 6,741,620 B2 | 5/2004 | Gerstenberger et al. | |
| 6,757,310 B2 | 6/2004 | Ming | |
| 6,901,090 B1 | 5/2005 | Ohtsuki | |
| 6,940,885 B1 | 9/2005 | Cheng et al. | |
| 7,251,258 B2 | 7/2007 | Wise et al. | |
| 7,283,426 B2 | 10/2007 | Grasso | |
| 7,372,880 B2 | 5/2008 | Jablonski et al. | |
| 7,391,561 B2 | 6/2008 | Di Teodoro et al. | |
| 7,429,734 B1 | 9/2008 | Tidwell | |
| 7,430,352 B2 | 9/2008 | Di Teodoro et al. | |
| 7,471,705 B2 | 12/2008 | Gerstenberger et al. | |
| 7,505,366 B1 | 3/2009 | Blackmon et al. | |
| 7,537,395 B2 | 5/2009 | Savage-Leuchs | |
| 7,620,077 B2 | 11/2009 | Henderson | |
| 7,724,797 B2 | 5/2010 | Essaian et al. | |
| 7,742,510 B2 | 6/2010 | Essaian et al. | |
| 8,953,647 B1 * | 2/2015 | Mead | H01S 3/06754 12/94 |
| 2002/0054613 A1 | 5/2002 | Kang | |
| 2002/0191171 A1 | 12/2002 | Nishi | |
| 2005/0169326 A1 | 8/2005 | Jacob et al. | |
| 2008/0170235 A1 * | 7/2008 | Rogers | G01P 5/26 356/521 |
| 2009/0103083 A1 * | 4/2009 | Kremeyer | G01N 21/1702 356/317 |
| 2009/0185583 A1 * | 7/2009 | Kuksenkov | G02F 1/3532 372/5 |
| 2009/0262761 A1 * | 10/2009 | Khitrov | H01S 3/06754 372/6 |

OTHER PUBLICATIONS

Borsutzky, et al., "Harmonic and Sum-Frequency Generation of Pulsed Laser Radiation in BBO, LBO and KD*P", "Appl. Phys.", Jan. 1991, pp. 55-62, vol. 52, No. 1.

Borsutzky, et al., "Tunable UV Radiation at Short Wavelengths (188-240 nm) Generated by Sum-Frequency Mixing in Lithium Borate", "Appl. Phys.", Jun. 1991, pp. 380-384, vol. 52, No. 6.

Brown, Daniel J.W., et al., "High-avg-power (15-W) 255-nm source based on 2nd-harmonic gen. of a Cu laser master osc. power amplifier system in CLBO", "Optics Letters", Dec. 1, 2001, pp. 1185-1887, vol. 26, No. 23.

Chang, L.B., et al., "Efficient compact watt-level deep-UV laser generated from a multi-kHz Q-switched diode-pumped solid-state laser system", "Optics Communications", Aug. 15, 2002, pp. 397-401, vol. 209.

Coherent, Inc. (Company), "Cesium Lithium Borate", "www.coherent.com/downloads/CLBO_DS.pdf", 2002.

Gerstenberger, David C., et al., "Noncritically phase-matched second harmonic generation in cesium lithium borate", "Optics Letters", Jul. 15, 2003, pp. 1242-1244, vol. 28, No. 14.

Knittel, Joachim, et al., "Fourth Harmonic Generation in a Resonant Ring Cavity", "IEEE Journal of Quantum Electronics", Nov. 1997, pp. 2021-2028, vol. 33, No. 11.

Kojima, Tetsuo, et al., "20-W ultraviolet-beam generation by fourth-harmonic generation of an all-solid-state laser", "Optics Letters", Jan. 1, 2000, pp. 58-60, vol. 25, No. 1.

Kuznetsov, Mark, et al., "Design and Characteristics of High-Power ( 0.5-W CW) Diode-Pumped VECSEL's with Circular TEM00 Beams", "IEEE Journal of Selected Topics in Quantum Elec.", May 1999, pp. 561-573, vol. 5, No. 3.

Lublinski, et al., "Collinear and Non-Collinear Sum Frequency Mixing in .beta.-BBO for a Tunable 195-198 nm all-solid-state Laser System", "Appl. Phys.", Nov. 1995, pp. 529-532, vol. 61, No. 5.

Oka, Michio, et al., "All Solid-state Continuous-Wave Frequency-Quadrupled Nd : YAG Laser", "IEEE Journal of Selected Topics in Quantum Elec.", Sep. 1995, pp. 859-866, vol. 1, No. 3.

Okhotnikov, O.G., et al., "Mode-locked ytterbium fiber laser tunable in the 980- 1070-nm spectral range", "Optics Letters", Sep. 1, 2003, pp. 1522-1524, vol. 28, No. 17.

Wall, Kevin F., et al., "A quasi-continuous-wave deep ultraviolet laser source", "IEEE Journal of Quantum Electronics", Sep. 2003, pp. 1160-1169, vol. 39, No. 9.

* cited by examiner

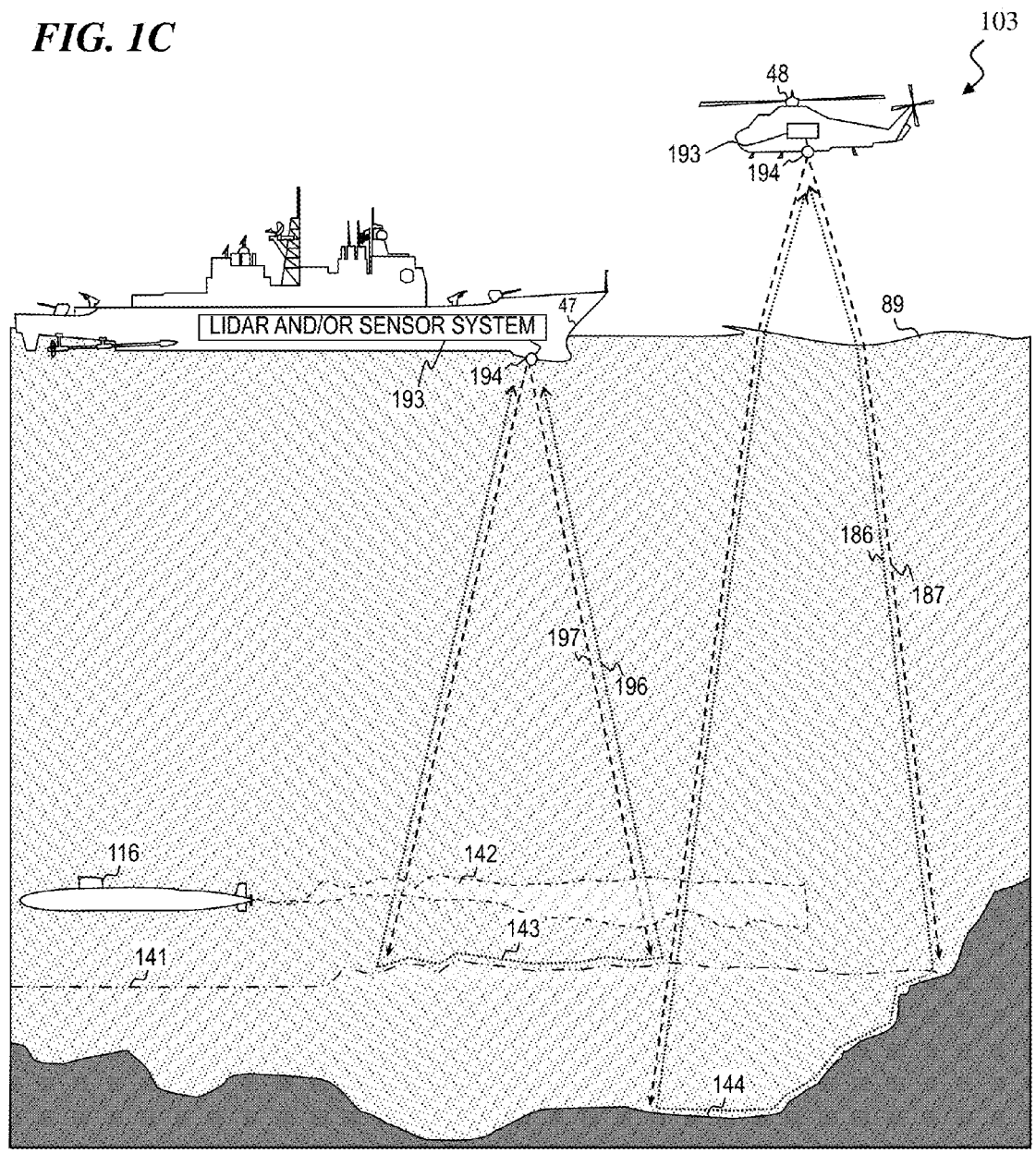

FROM SHASHAR, N. ET AL. J EXP BIOL 2004;207:3619-3628

FREQUENCY QUADRUPLED LASER USING THULIUM-DOPED FIBER AMPLIFIER AND METHOD

CROSS-REFERENCE TO RELATED APPLICATIONS

This application is a divisional of U.S. patent application Ser. No. 12/799,982 filed Apr. 28, 2010, titled "HIGH-POWER LASER USING THULIUM-DOPED FIBER AMPLIFIER AND FREQUENCY QUADRUPLING FOR BLUE OUTPUT" (which issued as U.S. Pat. No. 8,953,647 on Feb. 10, 2015), which claims priority benefit under 35 U.S.C. §119(e) to U.S. Provisional Patent Application No. 61/198,405 filed on Oct. 13, 2009, titled "HIGH-POWER LASER USING THULIUM-DOPED FIBER AMPLIFIER AND FREQUENCY QUADRUPLING FOR BLUE OUTPUT," each of which is incorporated herein by reference in its entirety.

This invention is related to:
- U.S. Provisional Patent Application Ser. No. 60/896,265 filed on Mar. 21, 2007, titled "HIGH-POWER, PULSED RING FIBER OSCILLATOR";
- U.S. patent application Ser. No. 12/053,551 filed on Mar. 21, 2008, titled "HIGH-POWER, PULSED RING FIBER OSCILLATOR AND METHOD" (which issued as U.S. Pat. No. 7,876,803 on Jan. 25, 2011);
- U.S. patent application Ser. No. 12/050,937 filed Mar. 18, 2008, titled "A METHOD AND MULTIPLE-MODE DEVICE FOR HIGH-POWER SHORT-PULSE-LASER ABLATION AND CW CAUTERIZATION OF BODILY TISSUES" (which issued as U.S. Pat. No. 8,202,268 on Jun. 19, 2012);
- U.S. Pat. No. 7,429,734 titled "SYSTEM AND METHOD FOR AIRCRAFT INFRARED COUNTERMEASURES TO MISSILES," issued Sep. 30, 2008 to Steven C. Tidwell, and filed Nov. 29, 2006;
- U.S. Pat. No. 7,430,352 titled "MULTI-SEGMENT PHOTONIC-CRYSTAL-ROD WAVEGUIDES FOR AMPLIFICATION OF HIGH-POWER PULSED OPTICAL RADIATION AND ASSOCIATED METHOD," issued Sep. 30, 2008 to Fabio Di Teodoro et al.;
- U.S. Pat. No. 7,391,561 titled "FIBER- OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD," issued Jun. 24, 2008 to Fabio Di Teodoro et al., and filed May 26, 2006;
- U.S. patent application Ser. No. 12/018,193 titled "HIGH-ENERGY EYE-SAFE PULSED FIBER AMPLIFIERS AND SOURCES OPERATING IN ERBIUM'S L-BAND" filed Jan. 22, 2008 (which issued as U.S. Pat. No. 7,872,794 on Jan. 18, 2011);
- U.S. Pat. No. 7,620,077 titled "APPARATUS AND METHOD FOR PUMPING AND OPERATING OPTICAL PARAMETRIC OSCILLATORS USING DFB FIBER LASERS," issued Nov. 17, 2009 to Angus J. Henderson;
- U.S. Pat. No. 7,471,705 titled "ULTRAVIOLET LASER SYSTEM AND METHOD HAVING WAVELENGTH IN THE 200-NM RANGE," issued Dec. 30, 2008 and filed Nov. 9, 2006; and
- U.S. Provisional Patent Application Ser. No. 61/263,736 titled "Q-SWITCHED OSCILLATOR SEED-SOURCE FOR MOPA LASER ILLUMINATOR METHOD AND APPARATUS," filed by Savage-Leuchs et al. on Nov. 23, 2009; which are all incorporated herein in their entirety by reference.

FIELD OF THE INVENTION

The invention relates generally to optical waveguides and more particularly to fiber lasers and fiber amplifiers that output high-peak-power pulses (well over a kilowatt (kW)), in a first output beam having a first infrared signal wavelength (e.g., in some embodiments, about 1900 nm), wherein the first output beam is passed through a wavelength-conversion device to generate a second output beam at a second blue or blue-green wavelength that is one-quarter the wavelength of the first signal wavelength, near 475 nm, wherein, in some embodiments, the blue or blue-green output is used for communications to and/or from underwater locations and/or for underwater LIDAR (light distancing and ranging) or imaging where this output wavelength is particularly beneficial for transmission through seawater.

BACKGROUND OF THE INVENTION

Conventional state-of-the-art lasers for outputting high-power blue-green or blue light having wavelengths in the 450-500-nm region are very costly, inefficient, and fragile. Prior-art devices for generating these wavelengths typically require many nonlinear conversion steps, including use of a tunable laser or optical parametric oscillator.

U.S. Pat. No. 6,288,835 titled "OPTICAL AMPLIFIERS AND LIGHT SOURCE" to Lars Johan Albinsson Nilsson is incorporated herein by reference. This patent describes single- or few-moded waveguiding cladding-pumped lasers, superfluorescent sources, and amplifiers, as well as lasers, including those for high-energy pulses, in which the interaction between the waveguided light and a gain medium is substantially reduced. This leads to decreased losses of guided desired light as well as to decreased losses through emission of undesired light, compared to devices of the prior art. Furthermore, cross-talk and inter-symbol interference in semiconductor amplifiers can be reduced. Also described are devices with a predetermined saturation power, and a single (transverse) mode optical fiber laser or amplifier in which the active medium (providing gain or saturable absorption) is shaped as a ring, situated in a region of the fiber's cross-section where the intensity of the signal light is substantially reduced compared to its peak value. The fiber can be cladding-pumped.

U.S. Pat. No. 4,867,558 titled "Method of remotely detecting submarines using a laser" that issued Sep. 19, 1989 to Leonard et al. and U.S. Pat. No. 4,893,924 titled "Method of remotely detecting submarines using a laser" that issued Jan. 16, 1990 also to Leonard et al. are both incorporated herein by reference. Leonard et al. describe monitoring subsurface water temperatures using a laser to detect subsurface waves in a body of water such as an ocean caused by a submarine. A pulsed laser beam is directed into the water to at least the depth of the thermocline and an analysis is made of the resultant Brillouin and Rayleigh backscatter components. Wavelength shifted Brillouin scatter is mixed with the unshifted Rayleigh scatter in a self-heterodyne manner for each volume element of illuminated water, and the frequency of the heterodyne signal is measured and converted into temperature. In those patents, the scheme is not directly detecting the submarine but instead is detecting the internal waves in the thermocline boundary in the seawater. The submarine's passage leaves ripples in the thermocline, which are subsequently detected by the system incorporating a laser.

U.S. Pat. No. 7,283,426 titled "Method and apparatus for detecting submarines" that issued to Grasso on Oct. 16, 2007 is incorporated herein by reference. Grasso describes detecting, tracking and locating submarines utilizing pulsed coherent radiation from a laser that is projected down through a water column, with particles in the water producing speckle from backscatter of the random particle distribution, with correlation of two closely time-spaced particle-based speckle patterns providing an intensity measurement indicative of the presence of a submarine. Subsurface submarine movement provides a subsurface wake which causes movement of particles such that two closely-spaced "snapshots" of the returns from particles in the same water column can detect particle movement due to the wake.

U.S. Pat. No. 5,270,780 titled "Dual detector LIDAR system and method" that issued to Moran et al. on Dec. 14, 1993 is incorporated herein by reference. This patent describes a light detection and ranging (LIDAR) system that uses dual detectors to provide three-dimensional imaging of underwater objects (or other objects hidden by a partially transmissive medium). An initial laser pulse is transmitted to known x-y coordinates of a target area. The photo signals returned from the target area from this initial pulse are directed to the low resolution, high bandwidth detector, where a preliminary determination as to the location (depth, or z coordinate) of an object in the target area is made based on the time-of-receipt of the return photo signal. A second laser pulse is then transmitted to the target area and the return photo signals from such second laser pulse are directed to the high resolution, narrow bandwidth detector. This high-resolution detector is gated on at a time so that only photo signals returned from a narrow "slice" of the target area (corresponding to the previously detected depth of the object) are received.

U.S. Pat. No. 5,504,719 titled "Laser hydrophone and virtual array of laser hydrophones" that issued to Jacobs on Apr. 2, 1996 is incorporated herein by reference. This patent describes a hydrophone or a virtual array of hydrophones for sensing the amplitude, frequency, and in arrays, the direction of sonic waves in water. The hydrophone employs a laser beam which is focused upon a small "focal" volume of water in which natural light scattering matter is suspended and which matter vibrates in synchronism with any sonic waves present. The vibration produces a phase modulation of the scattered light which may be recovered by optical heterodyne and sensitive phase detection techniques. The sonic waves are sensed at locations displaced from the focusing lenses.

U.S. Pat. No. 5,091,778 titled "Imaging LIDAR systems and K-meters employing tunable and fixed frequency laser transmitters" that issued to Keeler on Feb. 25, 1992 is incorporated herein by reference. Keeler describes a laser imaging system for underwater use that employs a wavelength-tunable laser. In particular, Keeler emphasizes the operation of the laser at blue wavelengths to optimize the performance in the open ocean.

U.S. Pat. No. 7,505,366 titled "Method for linear optoacoustic communication and optimization" that issued to Blackmon et al. on Mar. 17, 2009 is incorporated herein by reference. Blackmon et al. describe optical-to-acoustic energy conversion for optoacoustic communication from an in-air platform to an undersea vehicle. They describe directing a high-power laser at the ocean surface in order to generate acoustic waves (sound), wherein the sound is used as the communications signal to an underwater target receiver. Blackmon et al. assert that signals used in underwater acoustic telemetry applications are capable of being generated through a linear optoacoustic regime conversion process. They address the use of oblique laser beam incidence at an air-water interface to obtain considerable in-air range from the laser source to the water surface where the sound is formed to communicate to the undersea vehicle.

U.S. Patent Application Publication 2007/0253453 titled "Solid-state laser arrays using" published Nov. 1, 2007, and U.S. Patent Application Publication 2008/0317072 titled "Compact solid-state laser" published Dec. 25, 2008 both by Essaian and Shchegrov, are incorporated herein by reference. Essaian et al. describe a compact solid-state laser array for nonlinear intracavity frequency conversion into desired wavelengths using periodically poled nonlinear crystals. The crystals contain dopants such as MgO and/or have a specified stoichiometry. One embodiment includes a periodically poled nonlinear crystal chip such as periodically poled, MgO-doped lithium niobate (PPMgOLN), periodically poled, MgO-doped lithium tantalate (PPMgOLT), periodically poled, ZnO-doped lithium niobate (PPZnOLN), periodically poled, ZnO-doped lithium tantalate (PPZnOLT), periodically poled stoichiometric lithium niobate (PPSLN), and periodically poled stoichiometric lithium tantalate (PPSLT), periodically poled MgO- and ZnO-doped near-stoichiometric lithium niobate (PPMgOSLN, PPZnOSLN), or periodically poled MgO- and/or ZnO-doped near-stoichiometric lithium tantalate (PPMgOSLT, PPZnOSLT), for efficient frequency doubling of an infrared laser pump beam into the visible wavelength range. The described designs are said to be especially advantageous for obtaining low-cost green and blue laser sources. The use of such high-efficiency pumps and nonlinear materials allows scaling of a compact, low-cost architecture to provide high output power levels in the blue/green wavelength range.

What are needed are improved methods and apparatus for generating high-power pulses of infrared (IR) light of particular wavelengths and converting this light to blue-green and/or blue light. Also needed are systems capable of deep underwater communications, imaging, and other sensing using light obtained from a frequency-converted laser beam.

SUMMARY OF THE INVENTION

In some embodiments, the present invention provides an apparatus, method and associated fiber-laser architectures for high-power pulsed operation and for pumping of wavelength-conversion devices. In some embodiments, the wavelength conversion generates blue laser light by frequency quadrupling the infrared light from an initial thulium (Tm)-doped fiber laser using a non-linear wavelength conversion device. In some embodiments, the initial Tm-doped fiber laser uses a master-oscillator power-amplifier (MOPA) configuration that uses a seed laser beam from a semiconductor laser that is amplified by one or more fiber amplifiers. In other embodiments, the initial laser (or the seed laser if the initial laser uses a MOPA configuration) is a Q-switched or cavity-dumped ring fiber laser. In yet other embodiments, the seed source includes a distributed feedback (DFB) laser diode, a distributed Bragg reflector (DBR) laser diode, or a laser diode externally stabilized with a fiber Bragg grating or a volume Bragg grating.

In some embodiments, the one or more fiber amplifiers include a large-mode-area (LMA) fiber and/or include a polarization-maintaining (PM) fiber and/or include a multiply-clad fiber that uses cladding pumping and/or uses a plurality of stages (e.g., lengths of active (amplifying) fibers separated by "pump blocks" (e.g., monolithic free-space optical elements that inject additional pump light and/or filter the signal light to narrow the linewidth and/or remove amplified spontaneous emission (ASE) and then pass the signal light to a further amplifying fiber such as described in commonly assigned U.S. Pat. No. 7,537,395 titled DIODE-LASER-PUMP MODULE WITH INTEGRATED SIGNAL PORTS FOR PUMPING AMPLIFYING FIBERS AND METHOD that issued May 26, 2009, and as described in commonly assigned U.S. patent application Ser. No. 11/420,751 that was filed May 27, 2006 (which issued as U.S. Pat. No. 7,941,019 on May 10, 2011) titled MONOLITHIC PUMP BLOCK FOR OPTICAL AMPLIFIERS AND ASSOCIATED METHOD, and which are each incorporated herein by reference))).

In some embodiments, the frequency-quadrupled blue light from the laser is used for underwater communications, imaging, and/or object and anomaly detection. In some embodiments, the infrared (IR) light from the initial or seed laser is pulsed and/or otherwise amplitude modulated, wherein the pulses and/or other amplitude modulation encode data that is to be communicated to or from an underwater vehicle (such as a submarine) once the modulated light has its wavelength quartered (i.e., has its frequency quadrupled). In other embodiments, the frequency-quadrupled blue-light pulses are transmitted in a scanned pattern (such as a raster scan) and a light detector measures reflections of the light pulses to allow time-of-flight measurement of distances to objects or other anomalies in each of a plurality of directions (i.e., of the raster-scanned underwater volume), which in turn are used to generate a data structure representing a three-dimensional rendition of the underwater volume (i.e., of the scene being imaged) for viewing by a person or for other software processing and analysis.

The architectures of the present invention enable operation of the initial or seed fiber laser in Q-switched, cavity-dumping, or hybrid Q-switched/cavity-dumping modes. In all of these modes of operation, the initial or seed laser is designed as a unidirectional ring cavity, which minimizes pulse-to-pulse amplitude/temporal instabilities and feedback effects.

In some embodiments of the Q-switched mode, the initial or seed laser includes a large-core rare-earth-doped fiber featuring a core having a low numeric aperture (NA) (in some embodiments, the low core NA is explicitly configured and intended to minimize the fraction of spontaneous emission from the active species (e.g., the dopant) that is captured and amplified in the core), an electro-optic switch of high on/off extinction (10 dB or higher) that provides enough inter-pulse extinction to minimize circulation and amplification of spontaneous emission in the cavity of the initial or seed laser (in one of the invention's baseline embodiments, this modulator is a small-aperture rubidium titanyl phosphate (RTP) Pockels cell), an output coupler, and an intracavity bandpass filter to enforce lasing operation in a narrow wavelength range.

In some embodiments of the cavity-dumped mode, the initial or seed laser is configured in a similar manner, except that an output coupler is no longer necessary, since the optical power can be extracted from the laser cavity by the electro-optic switch itself. The same initial or seed laser can be configured to operate in both Q-switched and cavity-dumping modes as well as in hybrid modes (e.g., partial Q-switch, followed by cavity dumping). In some embodi-ments, the initial or seed laser can be used as, or inject laser light into, a regenerative solid-state optical amplifier.

Some embodiments include an all-fiber pulsed or Q-switched ring laser (such as described in U.S. Provisional Patent Application 61/263,736 titled "Q-SWITCHED OSCILLATOR SEED-SOURCE FOR MOPA LASER ILLUMINATOR METHOD AND APPARATUS," filed by Savage-Leuchs et al. on Nov. 23, 2009, which is incorporated herein by reference). Other embodiments use a different type of ring laser as the initial master-oscillator or seed stage in a master-oscillator power-amplifier (MOPA) system, or as a power-oscillator stage, the ring laser having a large-core rare-earth-doped fiber that is ring-connected with a free-space path having an electro-optic switch, output coupler, one-way (unidirectional) isolator and/or intracavity bandpass filter to enforce lasing operation in a narrow wavelength range (such as described in U.S. patent application Ser. No. 12/053,551, titled "HIGH-POWER, PULSED RING FIBER OSCILLATOR AND METHOD" filed by Di Teodoro et al. on Mar. 28, 2008, which is incorporated herein by reference, and which issued as U.S. Pat. No. 7,876,803 on Jan. 25, 2011). In some cavity-dumped modes, the laser is configured in a similar manner, except that an output coupler is no longer necessary, since the optical power can be extracted from the laser cavity by the electro-optic switch itself. In some embodiments, the same laser is configured to operate in Q-switched, cavity-dumping modes, in hybrid modes (e.g., partial Q-switch, followed by cavity dumping), or even continuous wave (CW; i.e., a laser beam that is continuous and substantially constant in amplitude when the laser is on, and not pulsed or amplitude modulated) wherein some downstream output beam is amplitude modulated. In some embodiments, the laser is used as, or injects laser light into, a regenerative solid-state amplifier, is used as a Raman amplifier, or is used as a Raman laser to access wavelengths in the near- and mid-infrared wavelength ranges, which wavelengths are then wavelength converted to one-quarter the wavelength using non-linear wavelength conversion. In some embodiments, the laser is also used to generate visible, ultra-violet, mid-infrared, and far-infrared terahertz (THz) radiation via nonlinear wavelength-conversion processes including frequency doubling, tripling and quadrupling; optical-parametric generation, optical-parametric amplification, and optical-parametric oscillation; difference-frequency mixing; sum-frequency mixing; and optical rectification. In some of any of these embodiments, the initial IR laser is used as a stand-alone laser whose output is wavelength converted to a wavelength in the range of 450-500 nm, while in other embodiments, the initial IR laser is used as a seed or master laser for one or more optical power amplifiers (the master-oscillator power-amplifier (MOPA) configuration), and the output of those one or more amplifiers is wavelength converted.

In some embodiments, the initial laser of the present invention, in all of its modes of operation (Q-switched, cavity-dumped, or partial Q-switch followed by cavity dumping), emits radiation in the 1650- to 2100-nm range (in some embodiments, using a fiber doped with Tm, Ho, or both) (and the final output wavelength is in the 412- to 525-nm range). In some embodiments, the wavelength is in the 1800- to 2000-nm range (and the final output wavelength is in the 450- to 500-nm range). In all of these embodiments, the initial laser can be used as a stand-alone laser whose output frequency is quadrupled, or as a seed laser for optical amplifiers whose output frequency is quadrupled.

In some embodiments, the present invention provides high-power output pulses that are used for underwater communications, or for detection of underwater objects or disturbances (such as turbulence due to submarines or marine animals), or for mapping sea-bottom topography.

Other advantages of the present invention include low cost, relatively compact footprint, few parts, solid-state parts, and relatively simple setup and operation.

BRIEF DESCRIPTION OF THE DRAWINGS

FIG. 1C is a perspective block diagram of a visible-light sensing/imaging system 103 using a frequency-quadrupled IR laser system 193 that outputs and/or detects light in a wavelength range of about 450 nm to about 500 nm.

FIG. 1D is a block diagram of a visible-light sensing/imaging system 104 using a frequency-quadrupled IR laser system 193 that outputs and/or detects light in a wavelength range of about 450 nm to about 500 nm.

DETAILED DESCRIPTION OF THE INVENTION

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component that appears in multiple figures. Signals and connections may be referred to by the same reference number or label, and the actual meaning will be clear from its use in the context of the description.

In some embodiments, the present invention provides an apparatus and process wherein a fiber ring laser is operated in Q-switched, cavity-dumping, or hybrid Q-switched/cavity-dumping modes. In some embodiments, the fiber laser operates in the infrared wavelengths (having one or more wavelengths selectable via the one or more active dopant species that is/are used in the fabrication of the fiber, and via the bandpass filter(s) used), and outputs short-duration very-high-power pulses (e.g., thousands of kilowatts, in some embodiments). In some embodiments, the output of the fiber ring laser is converted to radiation having a desired wavelength in the visible or ultra-violet for transmission through water, and in particular seawater, via nonlinear wavelength-conversion devices including frequency doubling, tripling, quadrupling and/or quintupling elements, optical-parametric generation units, optical-parametric amplification units, and optical-parametric oscillation units, difference-frequency mixing units, sum-frequency mixing units, and optical-rectification units, for example. Some embodiments also output radiation in the mid-infrared or far-infrared (THz) range for use in communication in air between aircraft and/or surface vessels.

Figure 1A:
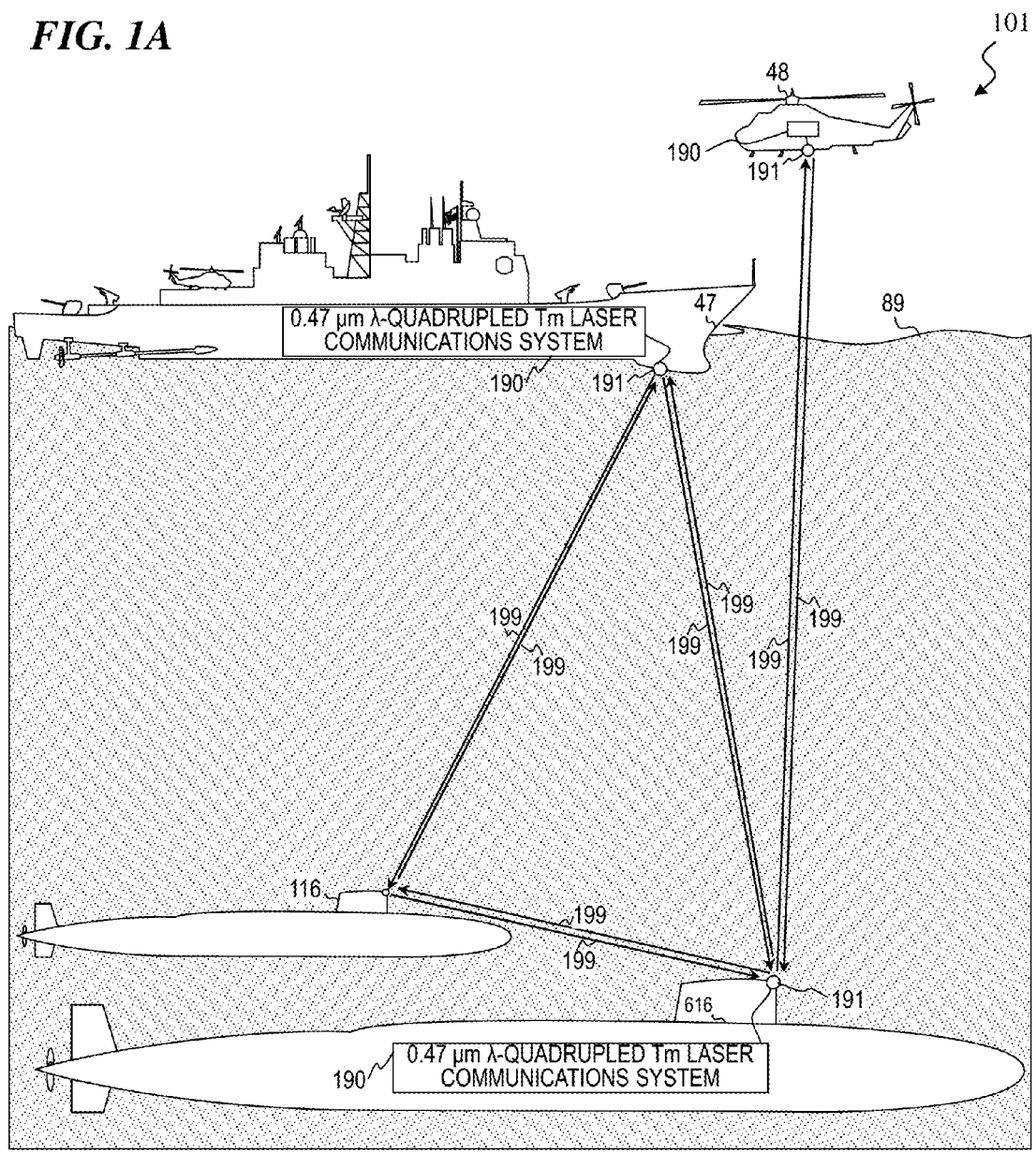
FIG. 1A is a perspective block diagram of a visible-light communications system 101 using a frequency-quadrupled IR laser system 190 that outputs and/or detects light in a wavelength range of about 450 nm to about 500 nm.

FIG. 1A is a perspective block diagram of a visible-light communications system 101 using a frequency-quadrupled IR laser system 190 that outputs and/or detects light in a wavelength range of about 450 nm to about 500 nm (generally perceived by humans as blue colors), according to some embodiments. In some embodiments, the initial source infrared (IR) laser has a wavelength of about 1800 nm to about 2000 nm. In some embodiments, an underwater vehicle 616 is in one-way or two-way communications with a remote vehicle (such as another underwater vehicle 116 (such as a submarine), a surface vessel 47 (such as a destroyer, missile cruiser or aircraft carrier) and/or an aircraft 48 (such as a helicopter or jet fighter) or a land vehicle (such as a HUMVEE®, not shown here ("HUMVEE" is a registered trademark of AM General Corp.)). Because green colors propagate better in the types of water found near shore, some embodiments mounted on a land vehicle use a frequency-quadrupled IR laser system 190 that outputs and/or detects light in a wavelength range of about 500 nm to about 550 nm (generally perceived by humans as green colors), and the initial source IR laser has a wavelength of about 2000 nm to about 2200 nm. In some embodiments, each such vehicle includes a transmitter and/or receiver portion of a communications system 190 connected by fiber-optic cables within the vehicle to and/or from a vehicle-to-external interface 191 (e.g., in some embodiments, a fiber-optic array and transform lens such as described in commonly assigned U.S. Pat. No. 7,429,734 titled "SYSTEM AND METHOD FOR AIRCRAFT INFRARED COUNTERMEASURES TO MISSILES," which issued to Steven C. Tidwell Sep. 30, 2008, which is incorporated herein by reference; or a laser-pointing turret or gimbal; or, in other embodiments, some other suitable laser-output port to the vehicle, such as a fixed wide-angle transmission lens having little directionality in order to not show an enemy observer which direction the communications target is located and thus to disguise or not reveal the location of the underwater target of the communications). In some embodiments, the transmitted laser beam 199 from each vehicle has a wavelength of approximately 470 nm (0.47 microns) or other suitable wavelength to which seawater is relatively transparent, and is modulated (e.g., using amplitude-modulation or pulse-width modulation or other suitable modulation scheme) with data (e.g., text, images, or other data, which may or may not be encrypted, as desired by the parties to the communication) that is to be communicated. In some embodiments, the communications system 101 is considered to include one or more of the vehicles 47, 48, 116, and/or 616, themselves, to which the data-and-laser systems 190 are mounted. The seawater surface (water-air interface) is labeled with reference number 89.

Figure 1B:
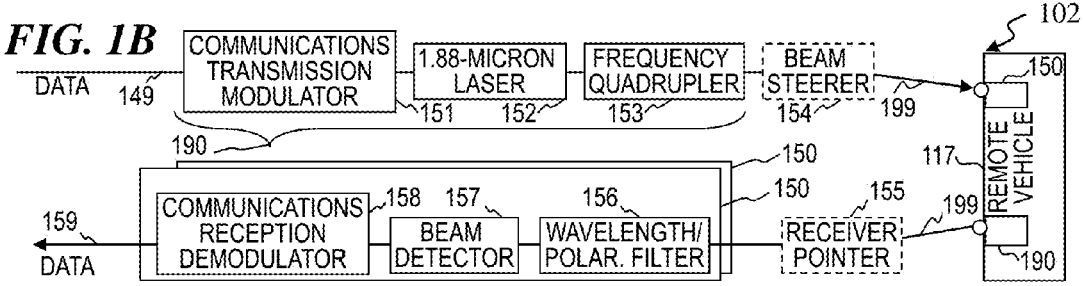
FIG. 1B is a block diagram of a visible-light communications system 102 using a frequency-quadrupled IR laser system 190 that outputs and/or detects light in a wavelength range of about 450 nm to about 500 nm.

FIG. 1B is a block diagram of a visible-light communications system 102 using a frequency-quadrupled IR laser transmission system 190 that outputs an encoded data stream that is modulated onto the transmitted output laser beam 199 having a narrowband (e.g., in some embodiments, a FWHM (full-width half-maximum) linewidth of 1 nm or less) light wavelength in a wavelength range of about 450 nm to about 500 nm (this output laser beam 199 is transmitted to a remote vehicle 117) and/or a receiver-detector system 150 that detects light in a wavelength range of about 450 nm to about 500 nm (this is received from remote vehicle 117), and demodulates the encoded data 159 which is output and/or stored. In some embodiments, the receiver-detector system 150 includes a filter 156 (in some embodiments, a narrowband wavelength filter and/or polarization filter) to essentially eliminate all wavelengths (and/or polarizations) other than the wavelength (and/or polarization) of the narrowband (and/or polarized) transmitted light 199, in order to increase the signal-to-noise ratio. In some embodiments, the data 149 that is to be communicated is supplied to communications-transmission modulator 151 which controls a modulation of the laser light generated by laser 152 (in some embodiments, this includes a thulium-doped fiber laser and/or thulium-doped fiber amplifier as described below). In some embodiments, the modulated and amplified intermediate laser beam has a wavelength of approximately 1880 nm (1.88 microns) that is coupled to frequency quadrupler 153 (which converts the wavelength to 25% of the original wavelength, which is 470 nm (0.47 microns)). In some embodiments, this 470-nm output beam (still having the data encoded on it) is directed in a particular direction by beam-steering unit 154. In some embodiments, beam-steering unit 154 is the external interface 191 of FIG. 1A. This beam steering directs a majority of the output beam toward the desired target receiver, in order to further improve signal strength and the signal-to-noise ratio of the signal. The portion of this signal 199 that is received by the remote target vehicle 117 (i.e., a vehicle at a distance from the transmitter vehicle) is processed as described in the next paragraph (in the description of the receiving apparatus 150). In some embodiments, the remote vehicle 117 also transmits encoded data on a laser beam that it generates and transmits in a manner as described earlier in this paragraph, using its own transmitting apparatus 190.

In some embodiments, each vehicle in system 102 of FIG. 1B has a receiving apparatus 150 configured to receive laser-beam communications from other vehicles. For example, in a surface ship (vehicle) 47 (see FIG. 1A), the laser beam 199 from the remote vehicle 117 is received (e.g., by an optional receiver pointer unit 155 that preferentially receives laser light of a particular wavelength (e.g., 470 nm) from a particular direction (e.g., from the direction of the remote vehicle 117) in order to increase its signal-to-noise ratio. In some embodiments, the received laser signal and any associated light noise (e.g., other wavelengths that are not desired) is passed through narrowband wavelength bandpass filter 156 that passes only the desired wavelengths (e.g., having a FWHM linewidth of 1 nm or less, centered at a wavelength of 470 nm) and rejects other wavelengths. This filtered light is then detected by beam detector 157 which generates an electrical signal representative of the encoded data, and this electrical signal is coupled to communications-reception demodulator 158, which then outputs the decoded data 159 (e.g., text, images, or other tactical or strategic data). In some embodiments, the beam-steering unit 154 and/or the receiver-pointer unit 155 are included in the vehicle-interface unit 191 of FIG. 1A.

In some embodiments, the transmitted beam 199 is polarized (e.g., in some embodiments, linearly polarized; in other embodiments, circularly polarized). In some embodiments, filter 156 of receiver 150 includes a polarizer having an orientation that is, or selectively can be, oriented to match the polarization of the transmitted beam 199. In other embodiments, receiver 150 is replicated in whole or in part, wherein a received light signal that includes beam 199 is directed through a polarizing beam splitter (considered part of filter 156), e.g., such that the horizontal polarized light is split from the vertically polarized light (in other embodiments, the incoming beam is split or received by different receiver pointers and each part directed through a separate polarized filter 156 having a different polarization). In some embodiments, the different polarizations are each detected and the resulting signals subtracted from one another in order to further distinguish the desired signal having one polarization from the portion of background light having a different polarization.

FIG. 1C is a perspective block diagram of a visible-light sensing/imaging system 103 using a frequency-quadrupled IR laser system 193 that outputs and/or detects light in a wavelength range of about 450 nm to about 500 nm. In some embodiments, system 103 transmits an output laser beam 197 that is used to illuminate an underwater scene 143 and/or 144 (e.g., a pulsed beam that when reflected can be used for determining ranges and directions to various objects). In some embodiments, a passing submarine or animal causes turbulence 142 that in turn causes a disturbance 143 to a neighboring thermocline 141. The transmitted laser beam 197 is reflected by disturbance 143 and the reflected light 196 is then detected and/or imaged via laser-interface unit 194 (e.g., attached to surface vessel 47, aircraft 48 or even another underwater vehicle such as vehicle 616 of FIG. 1A). In some embodiments, the transmitted laser beam 197 (which is a water-source to water-destination beam) is pulsed, and reflections from the water surface (in the case of aerial vehicles) and detection of the reflected pulse from various underwater features (such as thermoclines, sea life, and bottom surface) allows time-of-flight measurements that are combined with the angular direction of where the transmitted pulse was directed, and/or from which the reflected pulse was detected, to provide three-dimensional (3D) information from which a 3D image (e.g., one that is generated as two images to be viewable with stereoscope glasses to the left eye and right eye of a person viewing the 3D image) or a two-dimensional (2D) image (e.g., a 2D image where the viewpoint of the 3D data is rotatable (varying the azimuth and altitude angles) and zoomable (varying the distance from the 3D features) by the viewer using conventional 3D viewing software (such as software browsers capable of rendering X3D markup language (which is the ISO-standard XML-based file format for representing three-dimensional (3D) computer graphics), or Virtual Reality Modeling Language (VRML); the X3D standard features extensions to VRML (e.g., Humanoid Animation, NURBS (Non-Uniform Rational B-Splines, which are mathematical representations of 3D geometry that can accurately describe any shape from a simple 2D line, circle, arc, or curve to a very complex 3D organic free-form surface or solid), GeoVRML (VRML for the representation of geographical data), and the like), and enhanced application programming interfaces (APIs). In some embodiments, the scene being imaged includes underwater surface topology 144. In some embodiments, the output laser beam is focussed to a narrow beam that is scanned (e.g., in two angular directions to perform an X-Y raster scan or other suitable scan pattern), and the time-of-flight delays until the reflected signals are received are used to generate a 3D representation of the underwater scene. Light signals 197 represent the transmitted signal beam (where the transmitter and receiver are directly interfaced with, or located in, the water being examined), and received light signals 196 (which are due to light interactions with anomalies or objects and are shown as water-object-interaction to water-detector light signals). In a similar manner, light signals 187 represent the transmitted signal beam (where the transmitter and receiver are in air (e.g., aboard an aircraft 48) above the seawater surface (water-air interface 89), and thus propagate through air before going into the water being examined), and received reflections 186 represent water-object-interaction to in-air-detector light signals (which may also include a reflection from the seawater surface from the transmitted beam that did not enter the water).

FIG. 1D is a block diagram of a visible-light sensing/imaging system 104 using a frequency-quadrupled IR laser transmitter system 193 that outputs a pulsed waveform (amplitude modulated) transmitted laser beam 197 having a narrowband (e.g., in some embodiments, a FWHM (full-width half-maximum) linewidth of 1 nm or less) light wavelength in a wavelength range of about 450 nm to about 500 nm (this is transmitted toward the scene to be imaged) and a receiver-detector system 160 that detects light in the same narrowband wavelength range of (this is received from reflections from the water surface, underwater objects and sea life, thermoclines and the bottom surface), and processes the received reflections 196 (which are water-object-interaction to water-detector light signals) to generate 2D and/or 3D image information which is output and/or stored. In a similar manner, received reflections 186 in FIG. 1C represent water-object-interaction to in-air-detector light signals (which may also include a reflection from the seawater surface that must be dealt with (e.g., removed in order to better detect signals from under the water surface) and/or used as a height reference). In some embodiments, the receiver-detector system 160 includes a narrowband wavelength filter 166 to essentially eliminate all wavelengths other than the wavelength of the narrowband transmitted light 197, in order to increase the signal-to-noise ratio. In some embodiments, the pulsed waveform that is to be transmitted is supplied to a transmission modulator 161 which controls a modulation of the laser light generated by laser 162 (in some embodiments, this includes a thulium-doped fiber laser and/or thulium-doped fiber amplifier as described below). In some embodiments, the pulse-modulated and amplified intermediate laser beam has a wavelength of approximately 1880 nm (1.88 microns) that is coupled to frequency quadrupler 163 (which converts the wavelength to 25% of the original wavelength, which is 470 nm (0.47 microns). In some embodiments, this pulsed 470-nm output beam is directed in a pattern of particular directions (e.g., an X-Y scan pattern) by optional beam-steering unit 164 (e.g., directed to underwater scene 88). In some embodiments, an optional receiver pointer unit 165 is also synchronized and scanned along the same pattern of particular directions (e.g., the same X-Y scan pattern). This beam steering and reception pointing directs a majority of the output beam at any one time toward a particular angle (the portion of the 3D scene to be imaged), and restricts the received light to light received from that same direction in order to further improve signal strength and the signal-to-noise ratio of the signal. The portion 196 of the pulsed output signal 197 that is reflected and received by the receiver 160 (i.e., either in the same vehicle as the transmitter or in a second vehicle at a distance from the transmitter vehicle) is processed as described in the next paragraph (in the description of the receiving apparatus 160). In some embodiments, the transmitted beam 197 is polarized. In some embodiments where the transmitting/receiving vehicle is an aircraft 48, beam 197 is linearly polarized in a direction that enhances transmission through the air-water interface (since light of one polarization intersecting an air-water interface will reflect, while light of the orthogonal polarization will be transmitted through the air-water interface (especially when the angle of intersection matches Brewster's angle)).

In some embodiments, receiving apparatus 160 is configured to receive laser-beam reflections of the transmitted beam. In some embodiments, receiving apparatus 160 is in the same vehicle as the transmitter 193, while in other embodiments, receiving apparatus 160 is in a different vehicle located at a position that better receives the reflections from a particular underwater feature. Some embodiments include a receiver-pointer unit 165 that preferentially receives laser light of a particular wavelength (e.g., 470 nm) and/or polarization from a particular direction (e.g., from the direction of reflections of the transmitted beam) in order to increase its signal-to-noise ratio. In some embodiments, the received laser signal and any associated light noise (e.g., other ambient wavelengths that are not desired) is passed through filter 166 (e.g., in some embodiments, a narrowband wavelength bandpass filter) that passes only the desired wavelengths (e.g., having a FWHM linewidth of 1 nm or less centered at a wavelength of 470 nm) and rejects other wavelengths. In some embodiments, filter 166 includes a polarizing beamsplitter or similar apparatus that obtains two (or more) signals from different polarizations of the received light, wherein each polarized beam is detected by a respective beam detector 167 and the processing done by signal-reception image-processing unit 168 includes subtracting the signal from one polarization from the signal of another polarization (e.g., to remove ambient light signals that are in both polarizations), or other such signal processing to enhance the signal-to-noise ratio. In some embodiments, the output image data 169 is processed to generate X3D data structures such as can be readily viewed and manipulated using conventionally available virtual-reality rendering software, in order to enhance the visualization and simplify the storage and transmission of the 3D data.

In some embodiments, the transmitted pulsed light beam includes a frequency-quadrupled laser beam having a broad linewidth or two different polarizations, or the transmitted pulsed light beam includes two or more frequency-quadrupled laser beams, each having a different wavelength and/or polarization in order that the received reflected signal can be detected and analyzed in a manner that takes advantage of the wavelength and/or polarization sensitivity of different scattering, absorption, fluorescence, dispersion (detecting a change between different amounts of normal dispersion wherein the index of refraction of the material for blue wavelengths is higher than the index of refraction of the material for red wavelengths such that the bluer part (shorter wavelengths) of the transmitted spectrum travels slower than the redder part (longer wavelengths) of the spectrum, which results in the temporal spectrum of a pulse being distorted with its shorter wavelengths arriving after its longer wavelengths, or detecting a change between normal dispersion and anomalous dispersion wherein the redder part of the transmitted spectrum travels faster than the bluer part of the spectrum) or reflection mechanisms. In some embodiments, the pulse timing of the different transmitted pulsed signals is made either synchronous and simultaneous (wherein each pulse from each source is simultaneous with the pulses from the source having other wavelengths or polarizations), synchronous and non-simultaneous (wherein each pulse from each source is alternated with the pulses from the sources having other wavelengths or polarizations), or even asynchronous with pulses of other sources.

The direction-limited wavelength-and-polarization filtered light is detected by beam detector 167, which generates one or more electrical signals (representative of the various reflected polarizations and/or wavelength signal data), and these one or more electrical signals is, or are, coupled to image processor 168, which then outputs the image data 169 (e.g., 2D or 3D images, X3D or VRML data (i.e., data in industry-standard data formats used for 3D data or virtual-reality markup language formats), or other image, anomaly or object-detection data). In some embodiments, the beam-steering unit 164 and the receiver-pointer unit 165 are included in a vehicle-interface unit 194 such as shown in FIG. 1C.

In some embodiments, a single set of the IR laser and frequency-conversion apparatus is used for both underwater communications as described and shown in FIG. 1A and FIG. 1B, as well as for the imaging and object detection as described and shown in FIG. 1C and FIG. 1D. In some such embodiments, the information being communicated using the elements described in FIG. 1B is encoded onto the ranging pulses 197 that are being scanned for image acquisition, such as described in FIG. 1D, in such a manner that only the pulses in one particular direction have the data to be communicated to a communications target in that particular direction, while pulses in other portions of the scan pattern would not include the communicated data but instead would include noise or other pattern data or no pattern data. For example, if the scan pattern of pulses from the transmitter were transmitted at angles that formed an X-Y Cartesian pattern of 1024 pixels by 1024 pixels, and the vessel to be communicated with were located in the direction of a given pixel location (e.g., pixel grid location {348, 750}), then the pulses to that pixel grid location are modulated (e.g., the timing of the pulse, width of the pulse, amplitude of the pulse, and/or some other attribute of the pulse is varied) based on the data to be communicated, while pulses to other pixel grid locations could be varied in other ways in order that the communicated data and the direction to the target vessel could be disguised.

In some embodiments, the submarine (e.g., vehicle 116 of FIG. 1C) wishing to remain hidden or to disguise its position would include a receiver capable of detecting a scan pattern of the imaging or object-detection laser beam from another vehicle, e.g., a surface vessel 47 or aircraft 48, and to then transmit its own scan pattern with differing delays relative to the transmitted pulses in order that the scattering or reflections (or other light interactions) from the beam of the submarine 116 would be received by surface vessel 47 or aircraft 48 and be misinterpreted as innocuous terrain scattering, reflections and/or noise. If the imaging vehicle were transmitting CW or large-area pulsed light to illuminate and image an entire scene, the submarine could transmit a supplementary illumination toward the sea bottom that could hide thermocline disturbances caused by its passing.

Figure 2A:
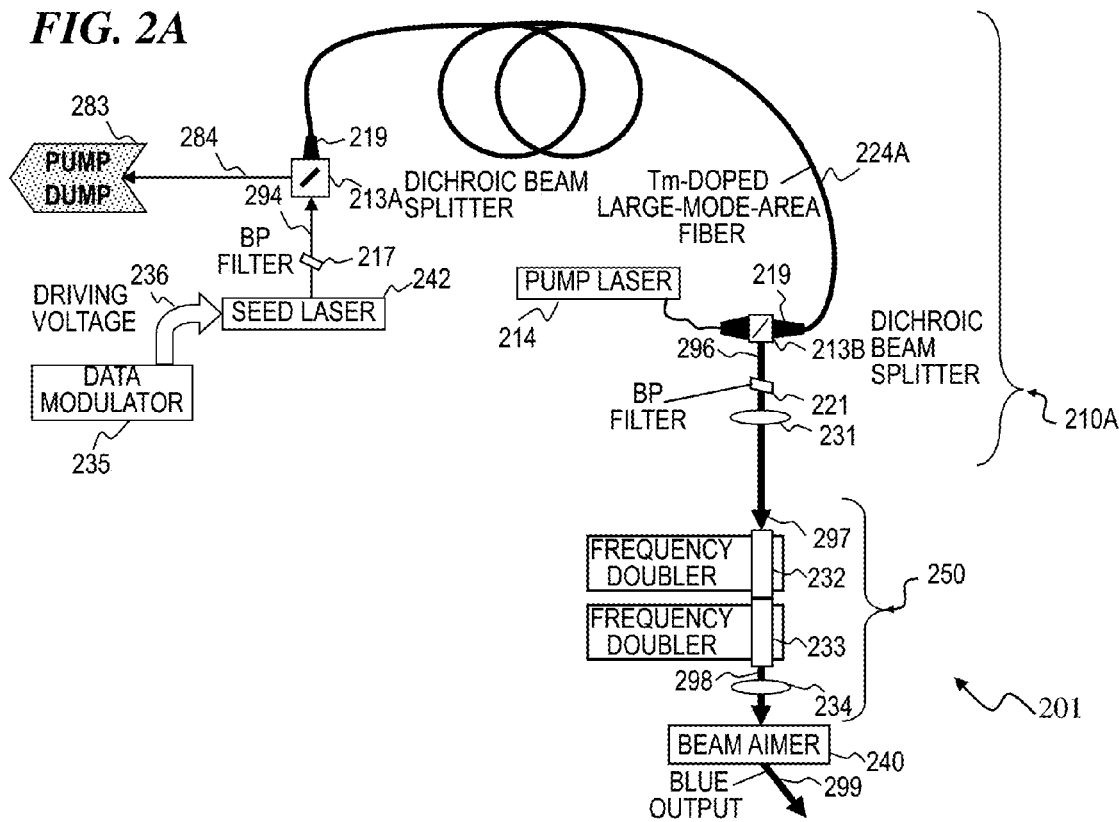
FIG. 2A is a block diagram of a visible-output system 201 using an IR master-oscillator power-amplifier (MOPA) source laser 210A and wavelength converter 250.

FIG. 2A is a block diagram of a visible-output master-oscillator power-amplifier (MOPA) system 201 using an IR semiconductor-and-fiber MOPA laser 210A. In some embodiments, system 201 includes an electronically-switched IR-signal semiconductor-and-fiber MOPA laser 210A that includes a rare-earth-doped fiber 224A (e.g., an optical fiber having a core doped with thulium (Tm) and/or holmium (Ho)) having couplers 219 at its ends that are used receive a free-space input signal beam 294 from the seed laser 242 in the upper-left of the diagram and amplify that signal to form a free-space intermediate output beam 296. In some embodiments, information is encoded and used by controller 235 to control some aspect of the pulse train (e.g., timing of pulses) imposed on input signal beam 294 in order that the amplified-and-wavelength-converted output beam 299 conveys that information to a remote receiver (such as described above in FIG. 1A and FIG. 1B). In other embodiments, the pulse train is controlled (e.g., by regular timing of pulses) in order that the output beam, when reflected or scattered by underwater anomalies (anomalies such as turbulence on an underwater thermocline or halocline, or objects (such as a submarine), or topography (such as the underwater seascape)) conveys that underwater remote information as various delays on the reflected light pulses received by a local receiver (such as described above in FIG. 1C and FIG. 1D). This configuration of system 201 provides additional amplification by power fiber amplifier 224A outside the seed-laser cavity. In some embodiments, MOPA laser 210A also includes an input dichroic beam splitter 213A that receives a seed laser signal 294 from seed laser 242 that has passed through bandpass filter 217 (optionally included in some embodiments, and used to narrow the line width of the seed laser signal), and input dichroic beam splitter 213A also removes unused counter-propagating pump light 284 and directs it to pump dump 283. In some embodiments, the light from pump laser 214 is multimode (low-quality) light; however, amplifying fiber 224A is configured as a large-mode-area large-core single-mode amplifier for the signal pulses from seed laser 242. In some embodiments, seed laser 242 includes a semiconductor laser (wherein the seed-laser pulses are obtained by modulating the electrical current supplied to the semiconductor laser, or are obtained by an optical modulator that amplitude modulates CW output of the semiconductor laser), while in other embodiments, seed laser 242 includes a Q-switched ring-fiber laser such as described below in FIG. 2B, for example, or in yet other embodiments, a CW ring-fiber laser such as described below in FIG. 2B but omitting the Q-switch modulator and instead providing an optical modulator that amplitude modulates CW output of the CW ring-fiber laser. In still other embodiments, a laser diode (i.e., a semiconductor device such as, for example, SAR-1850-20 laser diode operating at 1850 nm, SAR-2004-DFB laser diode operating at 2004 nm, SAR-2050-DFB laser diode operating at 2050 nm, or SAR-2350-20 laser diode operating at 2350 nm, each available from Sarnoff Corporation of 201 Washington Road, PO BOX 5300, Princeton, N.J., 08540) is either operated in pulsed mode to generate IR seed pulses or operated in continuous-wave mode to generate an initial IR laser signal that is then modulated using an optical modulator to generate IR seed pulses. These IR seed pulses are then amplified by a rare-earth-doped optical fiber and then frequency quadrupled. In yet other embodiments, a high-power semiconductor laser diode (i.e., a semiconductor device such as, for example, a PEARL laser diode operating at 1900 nm (or other predetermined wavelength between about 1800 nm and about 2000 nm) and up to 20 watts or more output power, available from nLight Corporation of 5408 NE 88th Street, Building E, Vancouver, Wash. 98665) is used to generate high-power IR pulses that are frequency quadrupled for use in the systems of the present invention.

In some embodiments, pump laser 214 launches pump light via an output dichroic beam splitter 213B in a counter-propagating direction to the amplified signal light that is emerging as beam 296, and bandpass filter 221 between lens 231 and beam splitter 213B is used to further narrow the bandwidth (also called the linewidth) of intermediate output beam 296. In some embodiments, output coupler/beam splitter 213B includes a dichroic beam splitter that reflects the high-power short-pulse signal light (so that the high-power signal beam does not pass through this element) and passes pump light straight through unimpeded into coupler 219. In some embodiments, the MOPA-laser output beam 296 is focused by lens 231 to generate beam 297 which is directed into wavelength-conversion device 250 (in some embodiments, device 250 includes a first frequency doubler 232 (e.g., that converts 1880-nm-wavelength light to 940-nm-wavelength light) and a serial second frequency doubler 233 (e.g., that converts 940-nm-wavelength light to 470-nm-wavelength light)), and its output 298 is collimated by lens 234 into optional beam-steering or beam-aiming device 240 to form directed output beam 299. In some embodiments, system 201 fits into a footprint of about 50 cm by 40 cm or smaller.

Figure 2B:
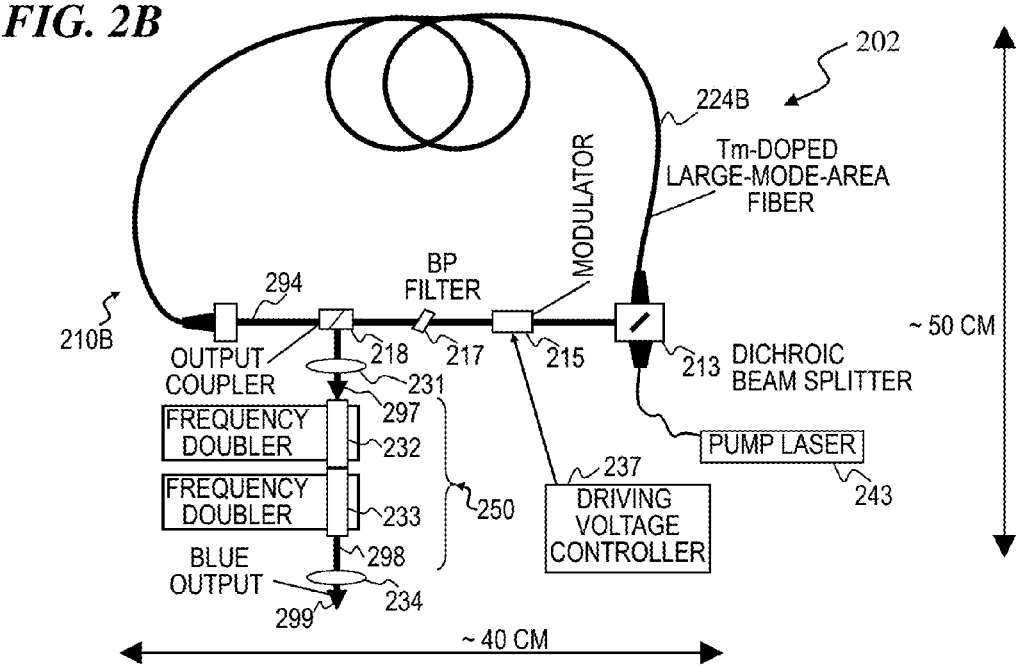
FIG. 2B is a block diagram of an IR-output system 202 using an IR ring laser 210B.

FIG. 2B is a block diagram of an IR-output system 202 using an IR power-oscillator ring laser 210B. In some embodiments, system 202 outputs a laser signal 297 that is (at least partially) used directly (e.g., for IR air-to-air communications), while in other embodiments, some or all of signal 297 is passed through a wavelength converter 250 (which, in some embodiments, includes a first frequency doubler 232 and a serial second frequency doubler 233, or, in other embodiments, includes an optical parametric oscillator (OPO) or optical parametric amplifier (OPA) or other suitable non-linear wavelength-conversion device). In some embodiments, electric controller 237 generates a shaped (e.g., in some embodiments, not a square pulse) electrical signal suitable to drive Q-switch 215 (e.g., an optical modulator that, in some embodiments, is operated in a manner to make the ring-laser system 202 be Q-switched, and which in other embodiments, alternatively is operated to be an amplitude optical modulator of an amplitude modulated but otherwise CW optical signal) in a manner that generates a more-constant-amplitude (e.g., substantially square-wave) output-light pulse train. In some embodiments, information (e.g., data to be communicated) is encoded and used by controller 237 to control some aspect of the pulse train (e.g., timing, width, and/or amplitude of pulses) in order that the output beam 299 conveys that encoded information to a remote receiver (such as described above in FIG. 1A and FIG. 1B). In other embodiments, the pulse train is controlled (e.g., timing of pulses) in order that the output beam, when reflected by underwater anomalies (such as turbulence on a thermocline) or topography (such as the underwater seascape) conveys that information as a reflected light pulse to a local receiver (such as described above in FIG. 1C and FIG. 1D). In the embodiment shown, pump laser 214 has its output coupled into gain fiber 224B using a free-space wavelength-dependent element such as a dichroic beam splitter 213 that passes pump light and reflects signal light (in order to avoid having high-power short-pulse signal pulses pass through the beam splitter which could damage the beamsplitter, and instead have the CW or longer-pulse lower-power pump light pass through the beam-splitting element). In some embodiments, system 202 has a physical footprint of no more than 0.2 meters (e.g., 50 cm by 40 cm).

Figure 3A:
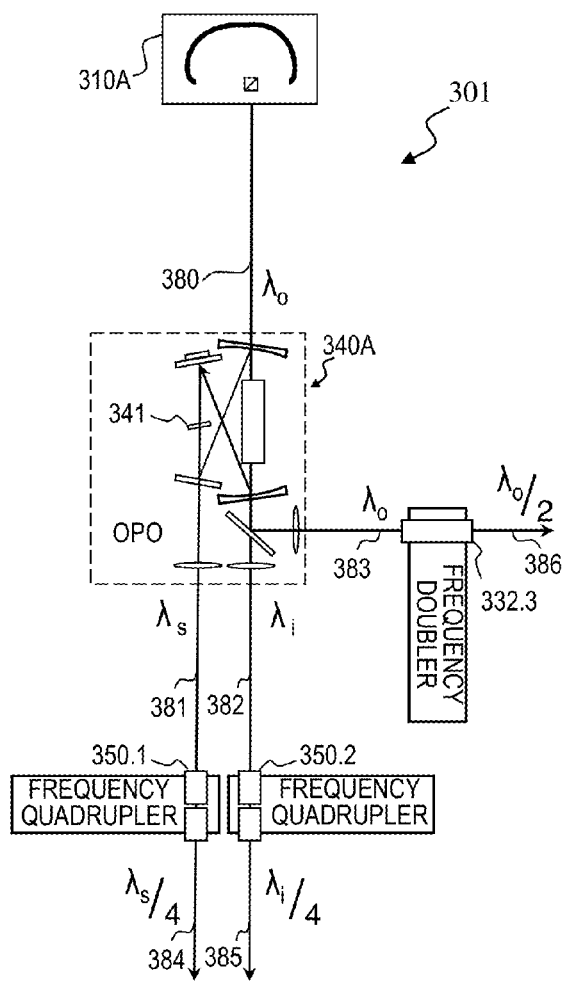
FIG. 3A is a block diagram of a one-or-more-wavelength-output system 301 using an IR laser 310A.
Figure 3B:
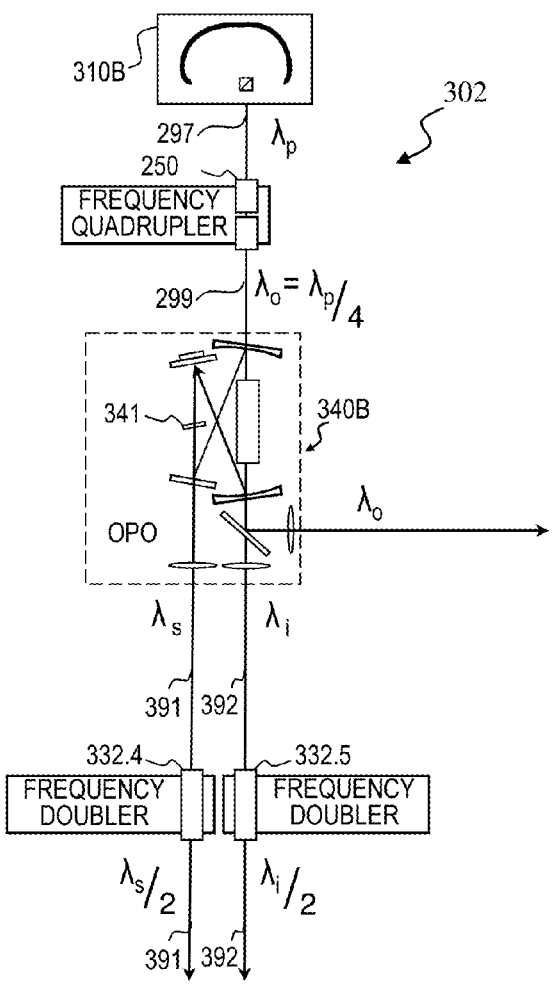
FIG. 3B is a block diagram of a one-or-more-wavelength-output system 302 using an IR laser 310B.

FIG. 3A is a block diagram of a one-or-more-wavelength-output system 301 using an IR laser 310A. In some embodiments, system 301 operates in a manner substantially similar to that described for system 202 of FIG. 2B, except that the fiber 224B of FIG. 2B, when used as laser 310A, is doped with a rare-earth (such as Yb) that lases efficiently at a shorter IR wavelength (e.g., such as 1064 nm, which is shorter than the 1800 to 2200 nm used, e.g., in the embodiments described above for FIG. 2A and FIG. 2B), and laser 310A outputs an initial high-power intermediate laser beam 380 having the shorter IR wavelength, which is first frequency-down-converted to two longer wavelengths by using the high-power shorter IR wavelength laser output beam 380 as the pump-light input to optical parametric oscillator (OPO) 340A and one or more frequency quadruplers 350.1 and 350.2 are placed at the respective outputs 381 and 382 of OPO 340A to generate output beams 384 and 385 respectively. In some embodiments, a frequency doubler (e.g., 332.3) is also used as a later stage for the unconverted pump light 383 of the OPO to generate output beam 386. In this way, wavelength converters operate to frequency-up-convert each of up to three wavelengths that are output by OPO 340A. In some embodiments, OPO 340A is operated to output coherent light at each of up to three different wavelengths, viz., light beam 383 at a pump wavelength $\lambda_o$ which is the unconverted portion of intermediate signal 380 (i.e., the output beam from laser 310A, which in various embodiments includes a ytterbium (Yb) doped laser lasing at 1064 nm, but which is otherwise configured as the IR laser 210A of FIG. 2A, the IR laser 210B of FIG. 2B, the IR laser 610 of FIG. 6, or the IR laser 710 of FIG. 7A), idler light beam 382 at an idler wavelength $\lambda_i$ that is one of the two wavelengths resonant in OPO 340A, and signal light beam 381 at a signal wavelength $\lambda_s$ that is the other of the two wavelengths resonant in OPO 340A. (Note that the "signal" beam and the "idler" beam and the unconverted "pump" beam are terms of art in relation to an OPO; as used in these embodiments, any one or two or even all three output beams derived from the OPO 340A of FIG. 3A and OPO 340B of FIG. 3B are used as signals.) A more detailed description of an OPO that can be used in system 301 is provided in U.S. Pat. No. 7,620,077 titled "APPARATUS AND METHOD FOR PUMPING AND OPERATING OPTICAL PARAMETRIC OSCILLATORS USING DFB FIBER LASERS," which issued Nov. 17, 2009 (which is incorporated herein by reference). In some embodiments, the resonant wavelength of OPO 340A is adjustable by adjusting its intracavity wavelength bandpass filter 341 (e.g., a Fabry-Perot resonator). For example, if the OPO pump wavelength of light beam 380 were 1064 nm, and one of the wavelength-converted output beams (e.g., signal beam 381) has a wavelength of 1850 nm, the other wavelength-converted output beam's (e.g., idler beam 382's) wavelength would be 2504 nm. If the pump wavelength is then doubled by wavelength converter 332.3, its output beam 386 would have a wavelength of 532 nm (green), and the other two beams 381 and 382 would be frequency quadrupled (to a wavelength of 462.5 nm (blue) of output beam 384 and a wavelength of 632 nm (red) of output beam 385, respectively), thus providing three output colors that could be used to distinguish imagable underwater objects. Of course, other embodiments use different pump wavelengths and different resonant wavelengths to obtain different output wavelengths.

FIG. 3B is a block diagram of a one-or-more-wavelength-output system 302 using an IR laser 310B. In some embodiments, system 302 uses a frequency quadrupler 250 between a thulium-doped laser 310B ((in some embodiments, frequency quadrupler 250 is implemented as a pair of serially operating frequency doublers such as frequency doublers 232 and 233 of FIG. 2A or FIG. 2B, using the output beam 297 from laser 310B (which in various embodiments includes the IR laser 210A of FIG. 2A, the IR laser 210B of FIG. 2B, or any of the other IR laser embodiments described herein)) having a wavelength of about 1900 nm (e.g., using a thulium-doped gain fiber in laser 310B) to obtain intermediate beam 299 having a 475-nm wavelength (i.e., corresponding to output beam 299 of FIG. 2B, but in the embodiment shown in FIG. 3B this beam is further wavelength converted to obtain other wavelengths) that is input to an OPO 340B having one resonant wavelength a little longer than 950 nm (e.g., 960 nm) and thus another resonant wavelength a little shorter than 950 nm (e.g., 940 nm), and each of these two converted wavelengths (idler and signal) is frequency doubled to obtain output wavelengths at 470 nm and 480 nm, and the residual pump wavelength at 475 nm is also output. In some embodiments, such closely-spaced wavelengths are used to distinguish objects having different interactions with the different wavelengths.

In some embodiments of the present invention, the gain fiber(s) used in the master-oscillator and/or power-amplifier stages of each of the described ring lasers are doped with Tm (in some embodiments, the lasing signal wavelength is about 1900 nm, while in other embodiments, the lasing signal wavelength is in the range of about 1700 nm to about 2100 nm), and in some embodiments, the pump light for the MOPA has a wavelength in the range of about 780 nm to 810 nm.

In some embodiments of the present invention, the gain fiber(s) used in the master-oscillator and/or power-amplifier stages of each of the described ring lasers is doped with Tm (in some embodiments, the lasing signal wavelength is about 1940 nm, while in other embodiments, the lasing signal wavelength is in the range of about 1880 nm and about 2040 nm, and, in some embodiments, a pump wavelength of about 794 nm is used, such as described in co-owned U.S. patent application Ser. No. 12/050,937, which is incorporated herein by reference, and which issued as U.S. Pat. No. 8,202,268 to Wells et al. on Jun. 19, 2012).

In some embodiments, the wavelength filter of the ring lasers can be adjusted by, e.g., tilting the filter element to achieve the desired wavelength of the ring laser.

In some embodiments of each of the other ring lasers in the figures (e.g., those shown in FIG. 1B, FIG. 1D, FIG. 2A, FIG. 2B, FIG. 6, and FIG. 7A) described herein, the respective gain fibers for the master oscillators, power oscillators, and/or power amplifiers include passive PM end fibers spliced to one or both ends of the gain fibers, in order to reduce heat in portions of the fiber that are not in good thermal contact with a heat sink (such as a water-cooled mandrel as described in U.S. patent application Ser. No. 12/053,551 filed on Mar. 21, 2008, titled "HIGH-POWER, PULSED RING FIBER OSCILLATOR AND METHOD," which is incorporated herein by reference, and which issued as U.S. Pat. No. 7,876,803 on Jan. 25, 2011).

For example, some embodiments use a rare-earth-doped fiber (e.g., in some embodiments, the length of gain fiber is in the range of 1-5 meters long; in some embodiments, having a thulium-doped core) having a core diameter (e.g., in some embodiments, a constant core diameter for the length of the fiber) in a range of about 10 microns to about 25 microns or larger and an outer diameter of between about 250 microns and about 400 microns (fibers such as these are available or can be ordered from companies such as Nufern, 7 Airport Park Road, East Granby, Conn. 06026, Coractive, 2700 Jean-Perrin, Suite 121, Quebec (Qc), Canada, G2C 1S9, or OFS, 2000 Northeast Expressway, Norcross, Ga., 30071).

As described in co-owned U.S. patent application Ser. No. 12/050,937 titled "METHOD AND MULTIPLE-MODE DEVICE FOR HIGH-POWER SHORT-PULSE-LASER ABLATION AND CW CAUTERIZATION OF BODILY TISSUES" that was filed Mar. 18, 2008 (which is incorporated herein by reference, and which issued as U.S. Pat. No. 8,202,268 on Jun. 19, 2012), some embodiments can also provide a continuous wave (CW) mode or quasi-CW mode by outputting a CW-activation signal in order to enable CW operation of the master oscillator without Q-switching.

In some embodiments, a power-amplifier pump laser is used to pump the power-amplifier stage (in some embodiments, this power-amplifier pump laser is a semiconductor laser bar (e.g., up to 50 watts or more in some embodiments)) that generates pump light having a wavelength of approximately 785 nm, which is effectively absorbed by the gain fiber in order to amplify the signal light to form the output signal beam. In some embodiments a master-oscillator pump laser is a semiconductor laser bar that generates pump light (e.g., up to 25 watts or more in some embodiments) also having a wavelength of approximately 785 nm, which is effectively absorbed by the master-oscillator's gain fiber in order to amplify feedback signal light to form the intermediate output (seed) signal beam.

Figure 4:
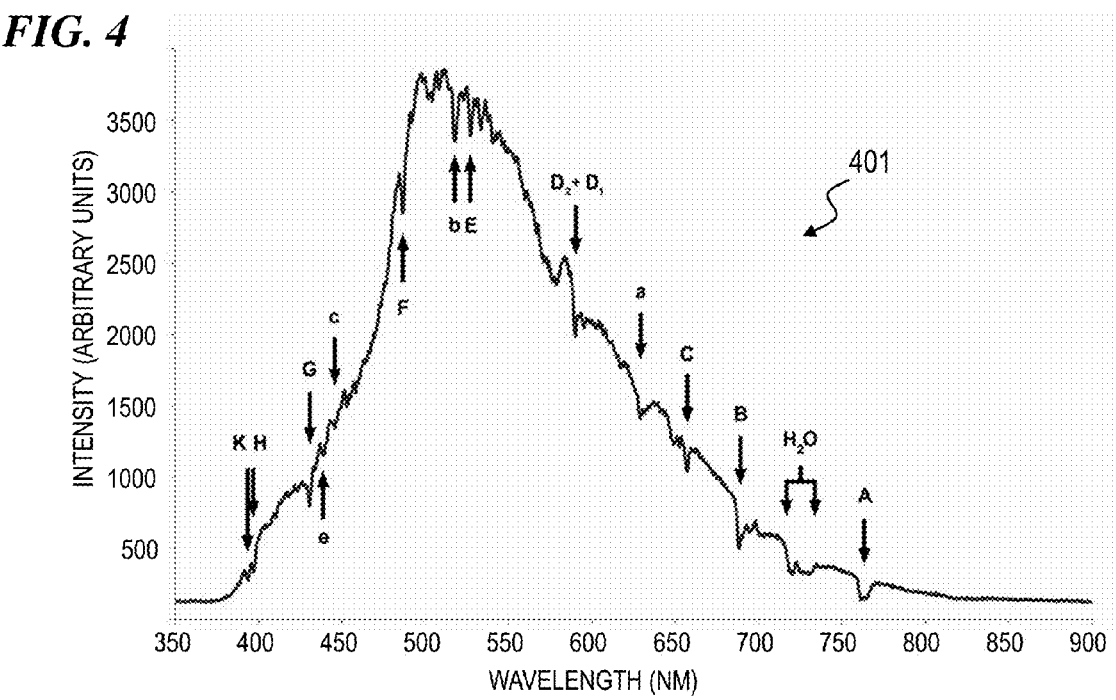
FIG. 4 is a graph 401 showing the spectrum of sunlight.

FIG. 4 is a graph 401 showing the spectrum of sunlight. The features in the spectrum labeled with various letters correspond to "Fraunhofer lines." At the wavelengths corresponding to Fraunhofer lines, the solar background is reduced, so the signal/background ratios for communication or LIDAR systems may be improved by operating at one of these wavelengths. In some embodiments, the wavelength of the quadrupled light beam is set to the wavelength of the feature F (one of the Fraunhofer features (absorption lines in the solar spectrum)) shown in graph 401. In some embodiments, the wavelength of the quadrupled light beam is set to the wavelength of one of the other Fraunhofer features (absorption lines in the solar spectrum).

Figure 5A:
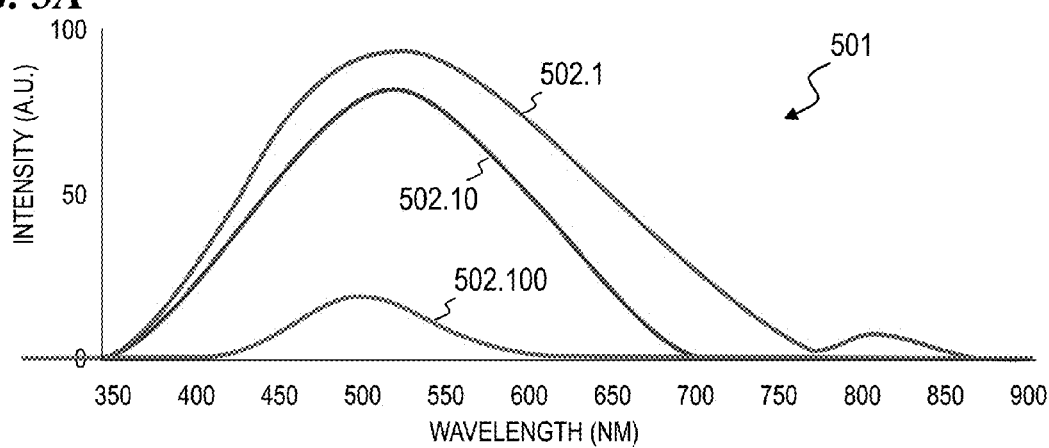
FIG. 5A is a series of graphs 501 showing sunlight penetration at various depths in seawater.

FIG. 5A is a series of graphs 501 that include a graph 502.1 showing sunlight penetration in seawater at 1 meter, a graph 502.10 for 10 meters, and a graph 502.100 for 100 meters.

Figure 5B:
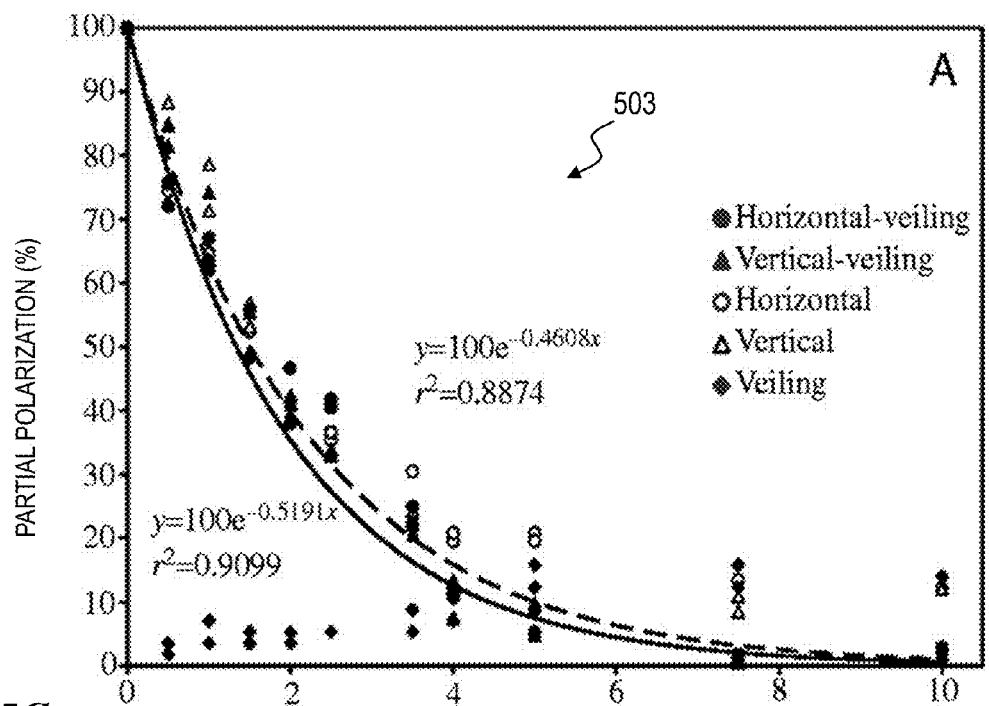
FIGS. 5B-5C are graphs 503-504 showing polarization differences of light in seawater.

FIG. 5B is a graph 503 showing polarization differences in light transmission through water.

Figure 5C:
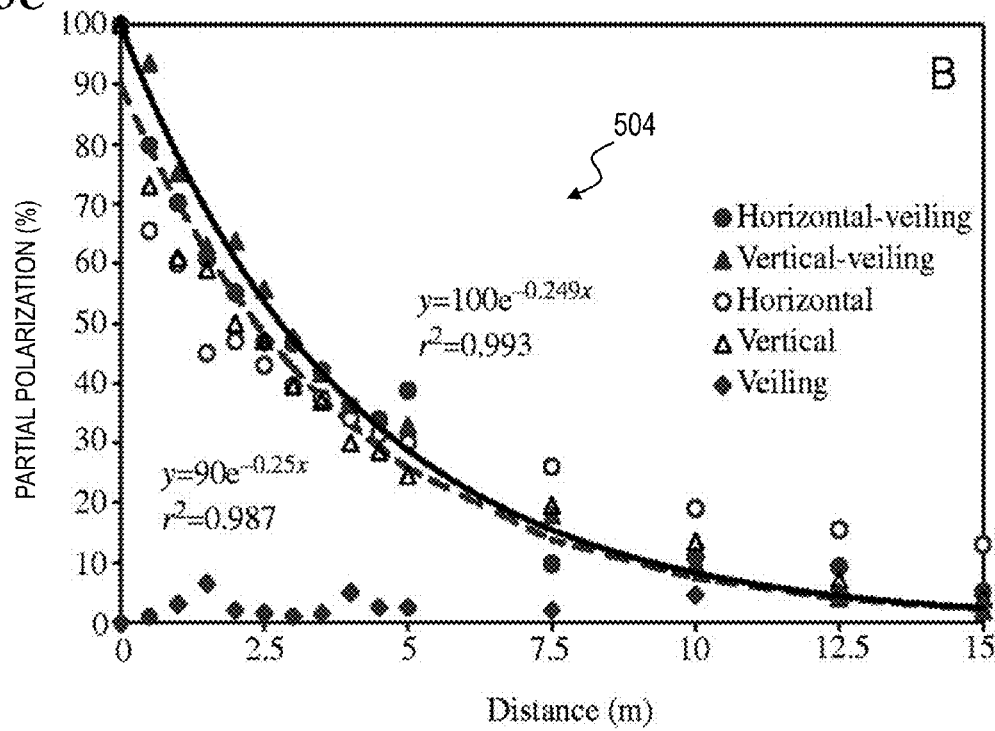

FIG. 5C is a graph 504 showing polarization differences in light transmission through water.

Figure 6:
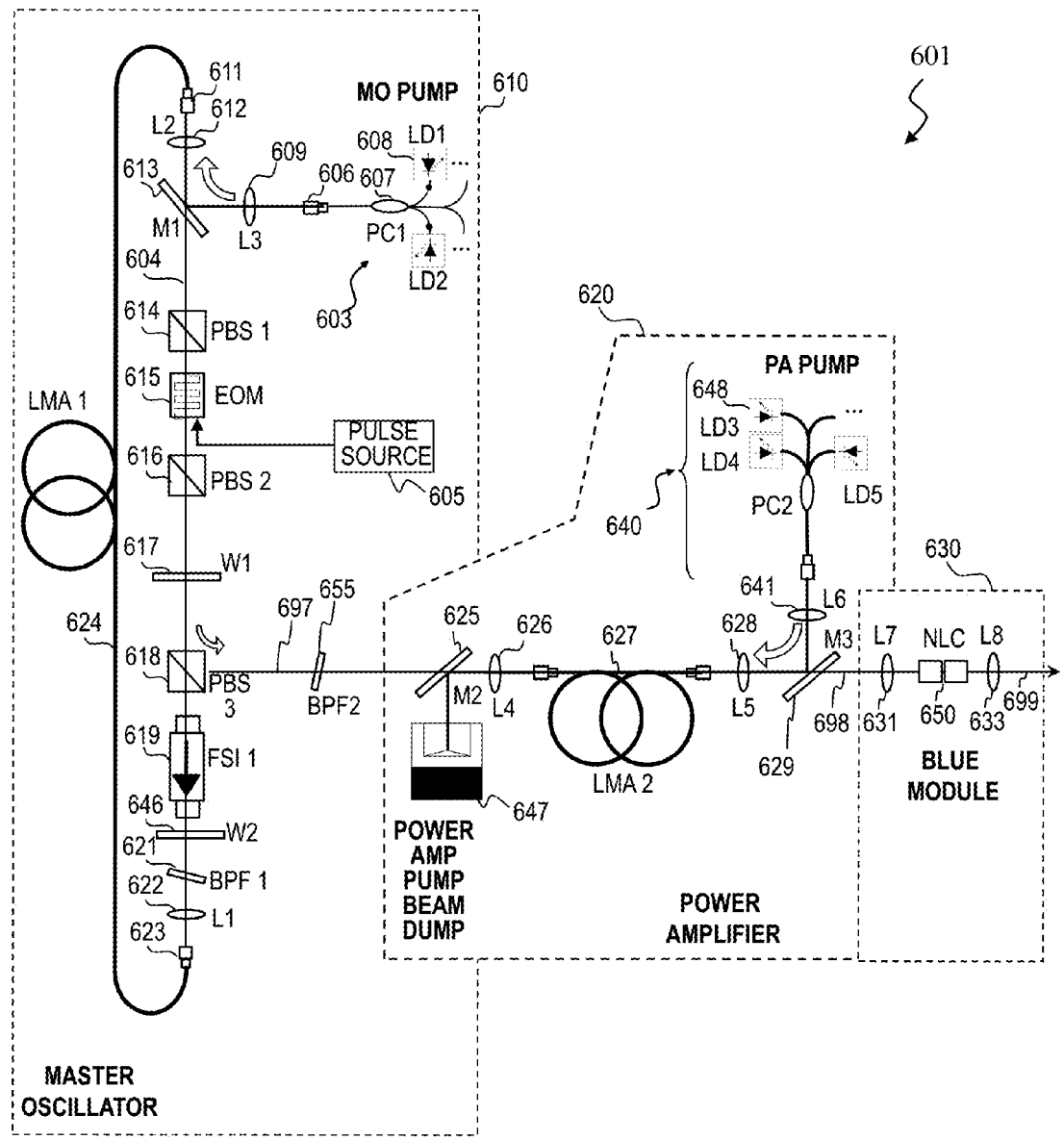
FIG. 6 is a block diagram of a visible-output system 601 using an IR ring laser 610.

FIG. 6 is a block diagram of a visible-output system 601 using an IR ring laser 610. In contrast to the power-oscillator operation of system 201 of FIG. 2A, the ring laser of FIG. 6 (and other MOPA lasers as described in U.S. patent application Ser. No. 12/053,551 filed on Mar. 21, 2008, titled "HIGH-POWER, PULSED RING FIBER OSCILLATOR AND METHOD," which is incorporated herein by reference (and which issued as U.S. Pat. No. 7,876,803 on Jan. 25, 2011), operates in a master-oscillator power-amplifier (MOPA) mode. In some embodiments, system 601 includes a Q-switched IR-signal fiber ring laser 610 that includes a rare-earth-doped (e.g., in some embodiments, thulium-doped) optical fiber 624 having fiber-to-free-space couplers (formed by fused silica endcap 623 and lens 622 (at the lower end in FIG. 6) and fused silica endcap 611 and lens 612 (at the upper end in FIG. 6)) that are used to form a free-space in-cavity beam 604. In the embodiment shown, ring laser 610 operates in a low-power master-oscillator mode, wherein the oscillator and power-amplifier functions of the laser are separated, and power amplifier 620, external to the oscillator ring, generates the high-power pulse 698 from the output signal 697 of the lower-power ring laser 610.

In some embodiments, ring laser 610 also includes a pump laser 603 (e.g., a moderately low-power diode laser that outputs a continuous-wave (CW) signal during operation of the laser), a dichroic beam splitter 613 (also labeled M1, indicating mirror 1, which reflects only the pump light) that passes the signal wavelength (traveling in a clockwise direction) but reflects the pump light in a counter-propagating counter-clockwise direction into the ring fiber 624, a first polarizing beam splitter 614, Q-switch modulator 615 driven by a pulsed driving voltage from pulse source 605, a second polarizing beam splitter 616, optical isolator 619 used to obtain unidirectional (in a clockwise direction, in the embodiment shown) signal in the ring laser, first half-wave plate 617, a third polarizing beam splitter 618 used to output the infrared intermediate output beam 697 through bandpass filter 655 and then dichroic beamsplitter 625 (also labeled mirror M2, which, in some embodiments, is replaced by an optical isolator that prevents any high-power signal or pump light from traveling in a backward direction from the power amplifier stage 620 into the master oscillator 610), wherein the signal 697 is amplified by power amplifier 620 to form high-power output signal pulses 698 that exit through lens 631. In some embodiments, low-power infrared intermediate output beam 697 passes through a second bandpass filter 655 before entering the power amplifier 620. In some embodiments the wavelength spectrum of low-power infrared intermediate output beam 697 is narrowed and determined by bandpass filter 655 (e.g., in some embodiments, a filter having a 1.0-1.5-nm-linewidth passband; in other embodiments, the filter has a less-than-1-nm pass-band). In the master oscillator ring 610, the clockwise-traveling signal light continues from polarizing beam splitter (PBS) 618 through bandpass filter 621 (e.g., a Fabry-Perot interferometer having an angle-adjustable wavelength selectivity). In some embodiments, the wavelength spectrum of beam 604 is narrowed and determined by bandpass filter 621 (e.g., in some embodiments, a filter having a 0.7-nm-linewidth pass-band, such as a bandpass filter part available from Barr Associates, Inc., 2 Lyberty Way, Westford, Mass. 01886 USA, having a web address www.barrassociates.com). In some embodiments, the pump light from pump laser 603 counter-propagates relative to beam 604, and is launched or combined (in the counter-clockwise direction in the figure) into the ring beam 604 by dichroic beam splitter 613 (e.g., in some embodiments, a dichroic beam splitter mirror, such as is available from Barr Associates, Inc.).

In some embodiments, isolator 619 (e.g., in some embodiments, an optical isolator such as is available from Electro-Optics Technology, Inc., 5835 Shugart Lane, Traverse City, Mich. 49684 USA having a web address www.eotech.com) ensures unidirectional (clockwise direction in the figure) lasing in the ring laser 610. In some embodiments, the gain fiber 624 is thulium doped to lase at about 1880 nm (e.g., in some embodiments, about 2 meters of thulium-doped gain fiber). In some embodiments, the Q-switch modulator 615 is an RTP Pockels cell (e.g., in some embodiments, Q-Switch: RTP, 4×4×20 mm from Raicol Crystals Ltd., 15 Giron St., Industrial Zone, Yehud, 56217 Israel, with a web site at www.raicol.com (as described in detail previously for FIG. 2A)).

In some embodiments, the half-wave retardation plates 617 and 646 (e.g., in some embodiments, part number CWO-1960-02-04 available from Lattice Electro-Optics of Fullerton, Calif. www.latticeoptics.com; or half-wave plates such as are available from CVI Laser, L.L.C., 200 Dorado SE, Albuquerque, N.Mex. 87123 USA, having a web address www.cvilaser.com) each provide a rotation in the direction of polarization of beam 604 by an amount greater than 45 degrees and less than 90 degrees, in some embodiments, with an angle set or optimized by measuring the output power with a power meter and maximizing the output power by adjusting the polarization angle. In some embodiments, beam splitters 614, 616, and 618 are polarizing beam-splitting (PBS) cubes (e.g., in some embodiments, such as are available from CVI Laser, L.L.C., or a Glan-Thompson ("walk-off") polarizer). In some embodiments, PBS 614 cleans up the polarization of the signal light before it enters modulator 615 (e.g., an electro-optic RTP Q-switch), while the second PBS 616 is used with the modulator 615 to pass or block the signal beam 604. Half-wave plate 617 is set to an angle that rotates the direction of polarization such that most of the signal beam is output to low-power infrared intermediate beam 697, while passing a small portion through narrow-linewidth bandpass filter 621 to seed further lasing. In some embodiments, a second half-wave plate 646 is used to rotate the seed light polarization to match the polarization angle of the gain fiber 624. In some embodiments, gain fiber 624 is a polarizing/polarization-maintaining amplifying fiber, e.g., in some embodiments, one that includes two "stress rods," one on either side of its 25-micron core in a 250-micron-diameter fiber, to promote and maintain polarized amplification in the fiber. In some embodiments, the bandpass filter 621 is a 0.7-nm-linewidth thin-film interferometer set at angle to select the desired wavelength. Lens 622 focuses the seed light into the endcap 623 of fiber 624.

In some embodiments, the low-power pulsed infrared intermediate beam 697 is focused by lens 626 into an endcap of power-amplifier fiber 627 where it is amplified using pump light from power-amplifier pump-laser subsystem 640 (which, in some embodiments, includes a plurality of laser diodes 648 that are directed into respective fibers that are joined by a fiber coupler into a single fiber, and output through a fiber-to-free-space coupler (e.g., in some embodiments, formed by a fused silica endcap) and collimated by lens 641 into a parallel beam that is reflected by dichroic beamsplitter 629 to lens 628 that focusses the pump beam in a counter-propagating direction (right-to-left in the diagram) to enter through a free-space-to-fiber coupler into fiber 627. Amplified signal pulses from the fiber (propagating in a left-to-right direction in FIG. 6) are collimated by lens 628 and pass through dichroic beamsplitter 629 to output as pulse beam 698, which is focused by lens 631 into non-linear device 650 (e.g., a series of two conventional frequency-doubling devices that change the output wavelength to one quarter its starting wavelength (e.g., in some embodiments, from 1880 nm to 470 nm)), as described above for FIG. 2A, and the frequency-quadrupled pulses are collimated by lens 633 and output as pulsed beam 699.

In some embodiments, the high-power pulsed infrared intermediate beam 698 is frequency quadrupled from 1880 nm (IR) to 470 nm (blue) by a wavelength-conversion device 650 that includes a first frequency-doubler non-linear crystal such as periodically poled MgO-doped lithium niobate (PPMgOLN) or periodically poled MgO-doped lithium tantalate (PPMgOLT) (used for medium to high power embodiments, because the MgO doping increases the optical-damage threshold) or periodically poled lithium niobate (PPLN) (used for low-power embodiments) that converts the 1880 nm (IR) to 940 nm (IR) wavelengths and a second frequency-doubler non-linear crystal such as lithium borate (LBO), or periodically poled nonlinear frequency doubling crystal such as PPMgOLN, PPMgOLT, PPZnOLN, PPZnOLT, stoichiometric PPLN (called PPSLN herein), or stoichiometric PPLT (called PPSLT herein) that converts the 940 nm (IR) to 470 nm (blue) wavelengths. In some embodiments, the first and second frequency-doubler non-linear crystals are selected from among those (such as PPMgOLN, PPMgOLT, PPZnOLN, PPZnOLT, PPSLN, or PPSLT) described in U.S. Patent Application Publication 2007/0253453 titled "Solid-state laser arrays using" and U.S. Patent Application Publication 2008/0317072 titled "Compact solid-state laser," which are incorporated herein by reference. In some such embodiments, the first frequency-doubler non-linear crystal is different than the second frequency-doubler non-linear crystal. Other embodiments use PPKTP (periodically poled potassium titanyl phosphate) or PPSLT that are quasi-phasematched. In other embodiments, lithium borate (LBO used in a non-critically phasematched configuration and operated at rather a high temperature of about 280 degrees C. for generating wavelengths about 485 nm) or bismuth borate (BiBO used in a critically phasematched configuration) are used for the frequency-quadrupling operation.

In some embodiments, the blue output beam is used for the underwater communications, imaging, or LIDAR applications shown in FIG. 1A, FIG. 1B, FIG. 2A, and/or FIG. 2B; in other embodiments, the blue-light output beam(s) is (are) used for any other suitable purpose, such as various medical purposes. In some embodiments, intermediate beam 698 includes up to 5000-watt pulses (up to 10 watts continuous) or more, and up to 25 percent or more of the intermediate beam 698 is converted to blue light of output beam 699, resulting in blue-light output of up to 1250 watts peak (up to 2.5 watts continuous) or more.

In some embodiments, the ring-laser output beam 698 is focused by lens 631 into wavelength-conversion device 632 (in some embodiments, a frequency quadrupler that quadruples the frequency, and thus quarters the wavelength of the light from infrared at 1880 nm to blue at 470 nm), and its output is collimated by lens 633 to form output beam 699. In some embodiments, a wavelength-selective dichroic mirror (not shown) is used in the output beam 699 to pass the converted wavelengths and block any residual infrared wavelengths.

In some embodiments, the high-power pulsed infrared intermediate beam 698 is frequency quadrupled from 1880 nm (IR) to 470 nm (blue) as described above for FIG. 2A, using blue module 630. In some embodiments, the blue output beam is used for the underwater communications, imaging, or LIDAR applications shown in FIG. 1A, FIG. 1B, FIG. 2A, and/or FIG. 2B; in other embodiments, the blue-light output beam(s) is (are) used for any other suitable purpose, such as possible medical purposes.

In some embodiments, intermediate beam 698 includes up to 5000-watt pulses (up to 10 watts continuous) or more, and up to 50 percent or more of the intermediate beam 898 is converted to blue light, resulting in blue-light output of up to 2500 watts peak (up to 5 watts continuous) or more.

In some embodiments, blue module 630 includes one or more dichroic mirrors (not shown) on output beam 699 that are used to remove unconverted IR pump light from power amplifier 620, and/or to add an optional auxiliary signal beam that is inserted to be co-axial with the output beam 699 (e.g., in some embodiments the auxiliary signal beam is generated by a low-power continuous-wave semiconductor diode laser with a wavelength that is substantially different from the wavelength of converted blue pulsed beam 699) such that output beam 699 includes the blue pulsed beam co-axially aligned with the auxiliary signal beam (such as described in U.S. patent application Ser. No. 12/053,551 filed on Mar. 21, 2008, titled "HIGH-POWER, PULSED RING FIBER OSCILLATOR AND METHOD," which is incorporated herein by reference, and which issued as U.S. Pat. No. 7,876,803 on Jan. 25, 2011).

Figure 7A:
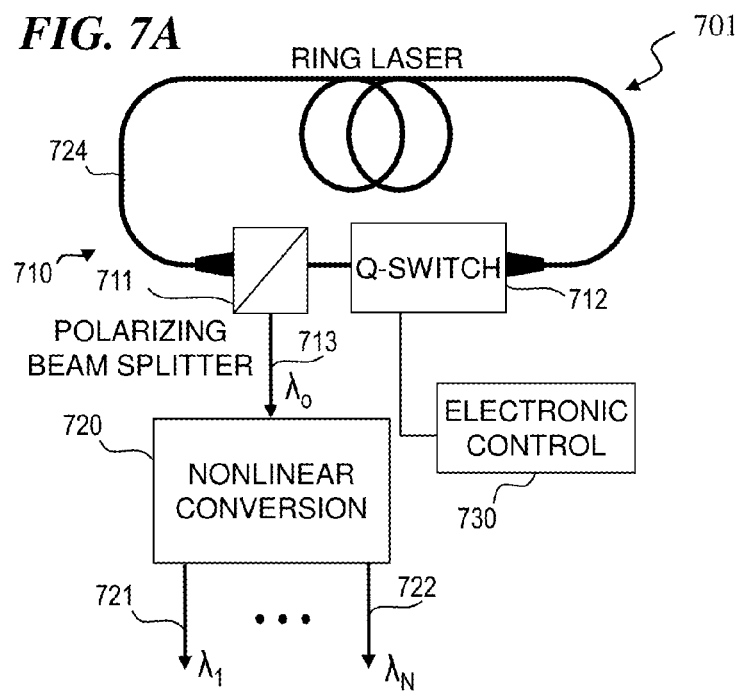
FIG. 7A is a block diagram of a multiple-wavelength-output system 701 using an IR ring laser 710.

FIG. 7A is a block diagram of a multiple-wavelength-output Q-switched ring-laser system 701 using an IR ring laser 710. In some embodiments, ring laser 710 includes a rare-earth-doped gain fiber 724, a Q-switch 712 controlled by electronic controller 730, and an output coupler 711 (e.g., a polarizing beam splitter in some embodiments) that outputs an intermediate output beam 713 having a wavelength of $\lambda_o$ that is processed by wavelength-conversion device 720 (in some embodiments, a non-linear optical device, such as a wavelength doubler or OPO or other suitable device) that outputs one or more output wavelengths 721 . . . 722 (e.g., wavelengths $\lambda_1$ through $\lambda_N$).

Figure 7B:
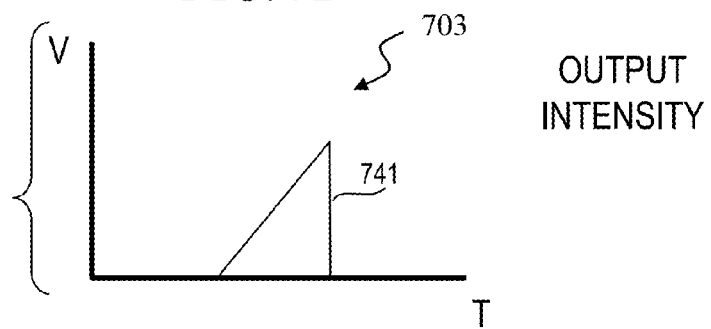
FIG. 7B is a graph 703 of an electrical-pulse waveform 741.

FIG. 7B is a graph 703 of the amplitude (in voltage, current or other suitable unit) over time of an electrical-pulse waveform 741. In some embodiments, an electrical pulse having an amplitude that increases over time (a ramp shape, such as shown) is output from controller 730 of FIG. 7A and used to drive Q-switch 712, where the increasing amplitude of the electrical pulse gradually opens the Q-switch in a manner that compensates for the decrease in cavity gain (and/or external amplifier gain) over time.

Figure 7C:
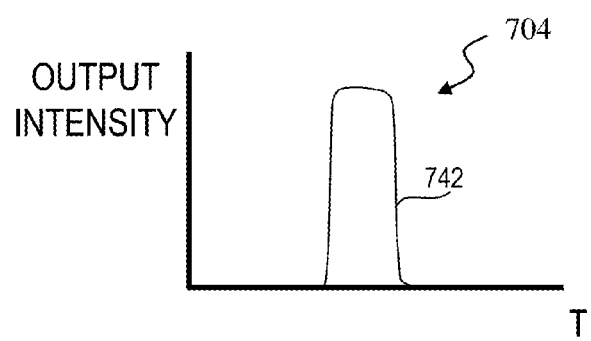
FIG. 7C is a graph 704 of an optical-pulse waveform 742.

FIG. 7C is a graph 704 of an idealized optical-pulse waveform 742 (representing the shape of pulses at output 713 of the above figures, wherein the pulse shape is approximately "square" (substantially constant over the duration of the pulse) because of the compensating nature of the Q-switch driving voltage.

Figure 8:
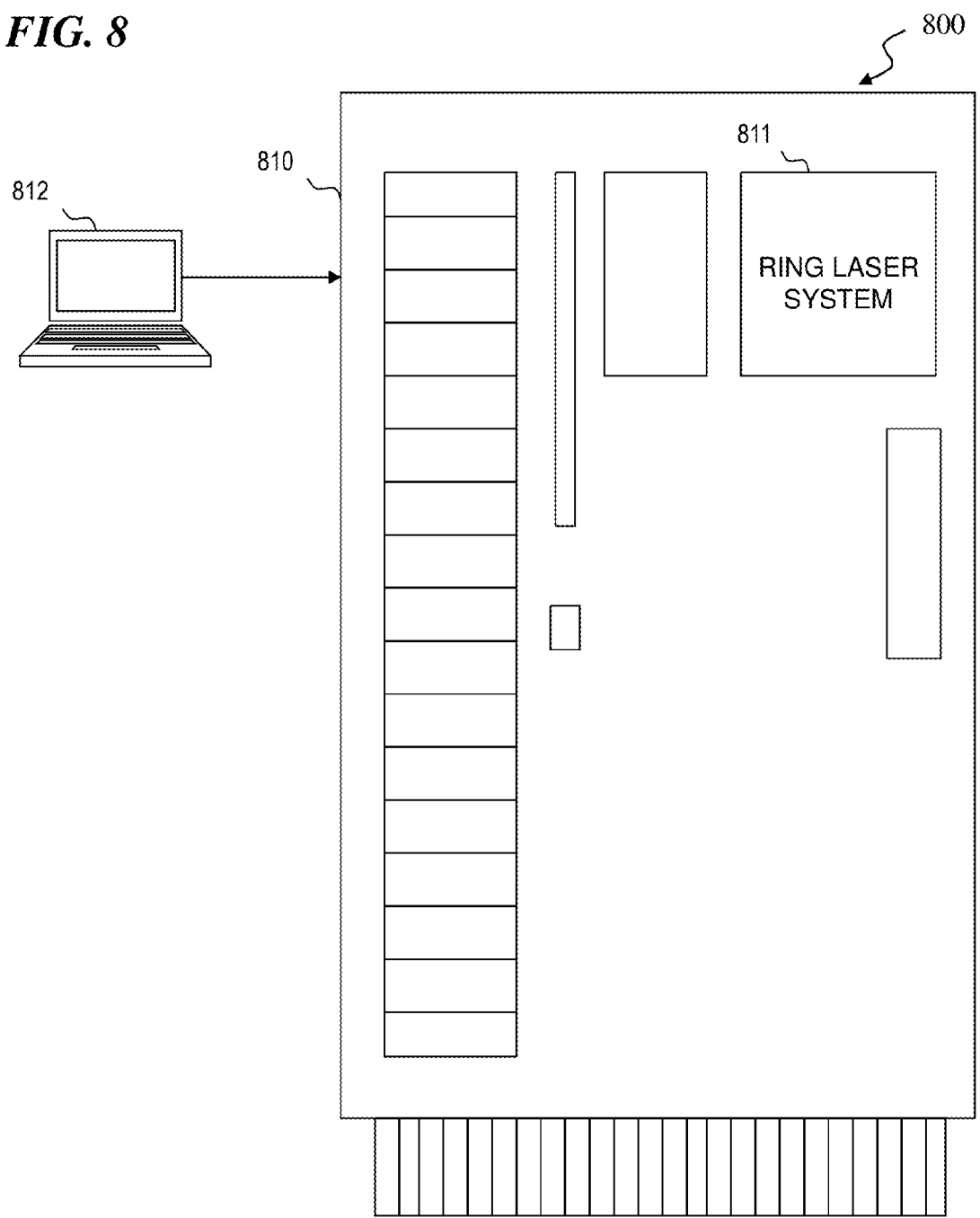
FIG. 8 is a block diagram of a materials-processing system 800 using one or more of the ring-laser systems 811 as described herein.

FIG. 8 is a block diagram of a materials-processing system 800 using one or more of the ring-laser systems 811 as described herein (e.g., ring-laser system 811 can include system 102 of FIG. 1B, system 104 of FIG. 1D, system 201 of FIG. 2A, system 202 of FIG. 2B, system 301 of FIG. 3A, system 302 of FIG. 3B, system 601 of FIG. 6 and/or system 701 of FIG. 7A). In some embodiments, materials-processing system 800 includes a production unit 810 that is controlled by one or more controllers 812 and which uses the laser output of one or more ring-laser systems 811. In some embodiments, each ring-laser system 811 includes one or more of the designs exemplified by the systems described above and shown in FIG. 1B, FIG. 1D, FIG. 2A, FIG. 2B, FIG. 3A, FIG. 3B, FIG. 6, and FIG. 7A. In various embodiments, the light output from the IR laser (e.g., light from beam 297 of FIG. 2B) is also used directly (in addition to the blue wavelength-converted light 299 of FIG. 2B), while in other embodiments, the light output from the IR laser is only an intermediate beam that is further wavelength converted by any of the wavelength-conversion devices described herein (such as a wavelength doubler or tripler, optical parametric generator (OPG), optical parametric oscillator (OPO), or operational parametric amplifier (OPA) or the like) and then the wavelength-converted light is output.

In some embodiments, the present invention provides high-power blue output pulses that can be used to remove paint, machine via holes (small holes in electronic substrates or printed circuit boards (PCBs)), metal and/or semiconductor annealing, laser welding, semiconductor-memory repair (e.g., opening metal lines to connect and/or disconnect spare sections of memory for other sections that have errors, thus increasing the yield of usable chips in memory manufacture), laser trimming of precision resistors (e.g., for analog-to-digital converters and digital-to-analog converters), other materials processing and/or the like.

Some embodiments include a materials-processing system having one or more of the laser systems described herein that is used to provide the laser energy for the materials-processing operation.

In some embodiments, the present invention provides a method that includes optically pumping a fiber ring laser having a beam path; forming a first signal beam in the beam path of the fiber ring laser; Q-switching the first signal beam; and extracting an intermediate output beam from the first beam. In some embodiments, this first signal beam is a first free-space signal beam. In some embodiments, the intermediate output beam is frequency quadrupled to generate a frequency-quadrupled beam.

In some embodiments, the intermediate output beam any of the embodiments of the present invention described herein has a wavelength in a range of 1800 nm to 2000 nm inclusive and the frequency-quadrupled beam has a wavelength in a range of 450 nm to 500 nm inclusive. In some embodiments, the intermediate output beam has a wavelength in a range of 1801 nm to 1820 nm inclusive and the frequency-quadrupled beam has a wavelength in a range of 450.25 nm to 455 nm inclusive. In some embodiments, the intermediate output beam has a wavelength in a range of 1821 nm to 1840 nm inclusive and the frequency-quadrupled beam has a wavelength in a range of 455.25 nm to 460 nm inclusive. In some embodiments, the intermediate output beam has a wavelength in a range of 1841 nm to 1860 nm inclusive and the frequency-quadrupled beam has a wavelength in a range of 460.25 nm to 465 nm inclusive. In some embodiments, the intermediate output beam has a wavelength in a range of 1861 nm to 1880 nm inclusive and the frequency-quadrupled beam has a wavelength in a range of 465.25 nm to 470 nm inclusive. In some embodiments, the intermediate output beam has a wavelength in a range of 1870 nm to 1890 nm inclusive and the frequency-quadrupled beam has a wavelength in a range of 467.5 nm to 472.5 nm inclusive. In some embodiments, the intermediate output beam has a wavelength in a range of 1881 nm to 1900 nm inclusive and the frequency-quadrupled beam has a wavelength in a range of 470.25 nm to 475 nm inclusive. In some embodiments, the intermediate output beam has a wavelength in a range of 1901 nm to 1920 nm inclusive and the frequency-quadrupled beam has a wavelength in a range of 475.25 nm to 480 nm inclusive. In some embodiments, the intermediate output beam has a wavelength in a range of 1921 nm to 1940 nm inclusive and the frequency-quadrupled beam has a wavelength in a range of 480.25 nm to 485 nm inclusive. In some embodiments, the intermediate output beam has a wavelength in a range of 1941 nm to 1960 nm inclusive and the frequency-quadrupled beam has a wavelength in a range of 485.25 nm to 490 nm inclusive. In some embodiments, the intermediate output beam has a wavelength in a range of 1961 nm to 1980 nm inclusive and the frequency-quadrupled beam has a wavelength in a range of 490.25 nm to 495 nm inclusive. In some embodiments, the intermediate output beam has a wavelength in a range of 1981 nm to 2000 nm inclusive and the frequency-quadrupled beam has a wavelength in a range of 495.25 nm to 500 nm inclusive. In some embodiments, the intermediate output beam has a wavelength in a range of 2001 nm to 2040 nm inclusive and the frequency-quadrupled beam has a wavelength in a range of 500.25 nm to 510 nm inclusive. In some embodiments, the intermediate output beam has a wavelength in a range of 2041 nm to 2080 nm inclusive and the frequency-quadrupled beam has a wavelength in a range of 510.25 nm to 520 nm inclusive. In some embodiments, the intermediate output beam has a wavelength in a range of 2081 nm to 2120 nm inclusive and the frequency-quadrupled beam has a wavelength in a range of 520.25 nm to 530 nm inclusive. In some embodiments, the intermediate output beam has a wavelength in a range of 2121 nm to 2160 nm inclusive and the frequency-quadrupled beam has a wavelength in a range of 530.25 nm to 540 nm inclusive. In some embodiments, the intermediate output beam has a wavelength in a range of 2161 nm to 2200 nm inclusive and the frequency-quadrupled beam has a wavelength in a range of 540.25 nm to 550 nm inclusive.

In some embodiments, the intermediate output beam has a wavelength in a range of 1600 nm to 1800 nm inclusive and the frequency-quadrupled beam has a wavelength in a range of 400 nm to 450 nm inclusive. In some embodiments, the intermediate output beam has a wavelength longer than 2200 nm and the frequency-quadrupled beam has a wavelength longer than 550 nm.

In some embodiments, the frequency-quadrupled beam is pulsed, and the pulses are modulated (e.g., via varying the timing and/or width of the pulses) with encoded data, and the encoded beam is transmitted through water to communicate the data between two platforms such as an underwater vessel and another vehicle. In some embodiments, the frequency-quadrupled beam is focussed and directed in a particular direction in order to increase the signal and/or the signal-to-noise ratio at the receiving destination platform.

Some embodiments further include opto-isolating the signal beam to travel only in a single direction around the ring.

Some embodiments further include filtering the signal beam to limit a linewidth of the signal beam in the ring.

In some embodiments, the Q-switching is electronically controlled. In some such embodiments, a timing of a pulse is determined by the electronically controlled Q-switcher. In some embodiments, the Q-switching includes using a Pockels cell. In some embodiments, the Q-switching includes using a rubidium titanyl phosphate (RTP) Pockels cell.

Some embodiments further include polarizing the signal beam to a linear polarization on each of two sides of the RTP Pockels cell.

In some embodiments, the extracting of the intermediate output beam from the free-space beam includes using a polarizing beam splitter.

Some embodiments further include rotating a direction of polarization by an empirically-determined amount on both of two sides of the output polarizing beam splitter.

In some embodiments, the opto-isolating of the signal beam is done between the two rotatings of the direction of polarization.

Some embodiments further include wavelength converting the intermediate output beam to a wavelength different from a wavelength of the intermediate output beam.

Some embodiments further include opto-isolating the signal beam to travel only in a single direction around the ring; filtering the signal beam to limit a linewidth of the signal beam in the ring laser, wherein the Q-switching includes using a rubidium titanyl phosphate (RTP) Pockels cell; polarizing the signal beam to a linear polarization on each of two sides of the RTP Pockels cell, wherein the extracting of the intermediate output beam from the free-space beam includes using a polarizing beam splitter; rotating a direction of polarization by 90 degrees on both of two sides of the polarizing beam splitter, wherein the opto-isolating of the signal beam is done between the two rotatings of the direction of polarization; and wavelength converting the intermediate output beam to a wavelength different from a wavelength of the intermediate output beam.

In some embodiments, the present invention provides an apparatus that includes a fiber-ring laser having a signal beam path, the fiber ring laser including an optically-pumped polarization-maintaining (PM) gain fiber that forms a portion of the signal beam path; a pump port configured to guide pump light into the gain fiber; fiber-end optics at each of two ends of the gain fiber, the fiber-end optics forming a free-space portion of the signal beam path; a Q-switch in the free-space signal beam path; and extraction optics configured to obtain an intermediate output beam from the free-space beam.

Some embodiments further include an opto-isolator in the signal beam path configured to limit the signal beam to travel only in a single direction around the ring.

Some embodiments further include a wavelength filter in the free-space portion of the signal beam path configured to limit a linewidth of the signal beam in the ring.

In some embodiments, the Q-switch includes a rubidium titanyl phosphate (RTP) Pockels cell.

Some embodiments further include two polarizers in the free-space portion of the signal beam path on each of two sides of the RTP Pockels cell to linearly polarize the signal beam on the two sides of the RTP Pockels cell.

In some embodiments, the extraction optics include a polarizing beam splitter.

Some embodiments further include a half-wave plate in the free-space portion of the signal beam path on each of two sides of the polarizing beam splitter.

In some embodiments, the opto-isolator is located between the two half-wave plates.

Some embodiments further include a wavelength-converting device optically coupled to receive the intermediate output beam and to convert a wavelength of the intermediate output beam to a wavelength different from the wavelength of the intermediate output beam.

In some embodiments, the present invention provides an apparatus that includes means for optically pumping a fiber ring laser having a beam path; means for forming a free-space signal beam in the beam path of the fiber ring laser; means for Q-switching the free-space signal beam; and means for extracting an intermediate output beam from the free-space beam.

Some embodiments further include means for opto-isolating the signal beam to travel only in a single direction around the ring.

Some embodiments further include means for filtering the signal beam to limit a linewidth of the signal beam in the ring.

In some embodiments, the means for Q-switching includes a rubidium titanyl phosphate (RTP) Pockels cell.

Some embodiments further include means for polarizing the signal beam to a linear polarization on each of two sides of the RTP Pockels cell.

In some embodiments, the means for extracting of the intermediate output beam from the free-space beam includes a polarizing beam splitter.

Some embodiments further include means for rotating a direction of polarization by 90 degrees on both of two sides of the polarizing beam splitter.

In some embodiments, the means for opto-isolating of the signal beam is located between the two rotators of the direction of polarization.

Some embodiments further include means for wavelength converting the intermediate output beam to a wavelength different from a wavelength of the intermediate output beam.

Some embodiments further include means for opto-isolating the signal beam to travel only in a single direction around the ring; means for filtering the signal beam to limit a linewidth of the signal beam in the ring, wherein the Q-switching includes using an optical amplitude modulator; means for polarizing the signal beam to a linear polarization, wherein the means for extracting of the intermediate output beam from the free-space beam includes a polarizing beam splitter; means for rotating a direction of polarization on both of two sides of the polarizing beam splitter, wherein means for the opto-isolating of the signal beam is between the two rotatings of the direction of polarization; and means for wavelength converting the intermediate output beam to a wavelength different from a wavelength of the intermediate output beam.

In some embodiments, one or more of the gain fiber(s) of each embodiment includes a photonic-crystal fiber (PCF) or photonic-crystal rod (PCR). In some such embodiments, the PCF or PCR is polarization maintaining (PM). In some embodiments, one or more of the gain fiber(s) of each embodiment includes a large-mode-area (LMA) fiber (e.g., in some embodiments, the mode-field diameter in the fiber is larger than about 12 microns, while in other embodiments, the mode-field diameter in the fiber is larger than about 25 microns, the mode-field diameter in the fiber is larger than about 50 microns, the mode-field diameter in the fiber is larger than about 75 microns, or the mode field diameter in the fiber is larger than about 100 microns). In some such embodiments, the LMA fiber is polarization maintaining (PM). In some embodiments, the LMA fiber has a numerical aperture (NA) of no more than about 0.15, while in other embodiments, the LMA fiber has an NA of no more than about 0.12, the LMA fiber has an NA of no more than about 0.10, the LMA fiber has an NA of no more than about 0.08, or the LMA fiber has an NA of no more than about 0.06.

In some embodiments, the amplified IR output beams (either from a power oscillator or from a MOPA) include pulses of at least 5 kW and an average power of at least 10 W. Some embodiments use a plurality of gain stages, which, in some embodiments, are each separated by an isolator (a one-way optical element to prevent backward-traveling light) and/or a narrowband filter (to reduce amplifier spontaneous emission (ASE) and/or clean up the signal pulses). In some embodiments, one or more of the power amplifier stages use a photonic-crystal fiber (PCF) or photonic-crystal rod (PCR) as described in U.S. Pat. No. 7,391,561 titled "FIBER- OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD," which issued Jun. 24, 2008 and which is incorporated herein in its entirety by reference. In some embodiments, one or more of the power amplifier stages use a non-photonic-crystal fiber having a large mode area (LMA) that has a mode-field diameter of at least about 12 microns, while other embodiments use an LMA fiber that has a mode-field diameter of at least about 20 microns, an LMA fiber that has a mode-field diameter of at least about 40 microns, an LMA fiber that has a mode-field diameter of at least about 60 microns, an LMA fiber that has a mode-field diameter of at least about 80 microns, or an LMA fiber that has a mode-field diameter of at least about 100 microns. In some embodiments, the amplified IR output beams include pulses of at least 1 kW. In other embodiments, the amplified IR output beams include pulses of at least 2.5 kW. In other embodiments, the amplified IR output beams include pulses of at least 5 kW. In other embodiments, the amplified IR output beams include pulses of at least 10 kW. In other embodiments, the amplified IR output beams include pulses of at least 25 kW. In other embodiments, the amplified IR output beams include pulses of at least 50 kW. In other embodiments, the amplified IR output beams include pulses of at least 100 kW. In other embodiments, the amplified IR output beams include pulses of at least 250 kW. In other embodiments, the amplified IR output beams include pulses of at least 500 kW. In other embodiments, the amplified IR output beams include pulses of at least 1000 kW. In other embodiments, the amplified IR output beams include pulses of at least 10 kW and an average power of at least 20 W. In some of each of these embodiments, the amplified IR output beam is polarized (in some embodiments, this polarization makes the non-linear conversion to other wavelengths more efficient).

In some embodiments, the wavelength-conversion device includes apparatus and methods such as described in U.S. Pat. No. 7,471,705 titled "ULTRAVIOLET LASER SYSTEM AND METHOD HAVING WAVELENGTH IN THE 200-NM RANGE," which issued Dec. 30, 2008 and which is incorporated herein in its entirety by reference. In some embodiments, the wavelength-converted beams include output pulses of at least 2.5 kW and an average power of at least 5 W. In other embodiments, the wavelength-converted beams include output pulses of at least 1.25 kW and an average power of at least 2.5 W. In other embodiments, the wavelength-converted beams include output pulses of at least 5 kW and an average power of at least 10 W. In other embodiments, the wavelength-converted beams include output pulses of at least 25 kW. In other embodiments, the wavelength-converted beams include output pulses of at least 50 kW. In other embodiments, the wavelength-converted beams include output pulses of at least 100 kW. In other embodiments, the wavelength-converted beams include output pulses of at least 250 kW. In other embodiments, the wavelength-converted beams include output pulses of at least 500 kW. In some of each of the above embodiments in this paragraph, the wavelength-converted beams include wavelengths that are one-quarter the wavelength of the amplified IR output beams (e.g., a wavelength-converted wavelength of 470 nm if the IR wavelength is 1880 nm, or other suitable IR wavelength that is four times the desired wavelength-converted output wavelength). In some of each of the above embodiments in this paragraph, the wavelength-converted beams include wavelengths that are one-third the wavelength of the amplified IR output beams (e.g., a wavelength-converted wavelength of about 475 nm if the IR wavelength is 1425 nm, or other suitable IR wavelength that is three times the desired wavelength-converted output wavelength; wherein in some embodiments, the 1425-nm IR laser beam (or other suitable IR wavelength) is generated using a cascaded Raman fiber laser). In some of each of the above embodiments in this paragraph, the wavelength-converted beams include wavelengths that are one-quarter the wavelength of the amplified IR output beams (e.g., a wavelength-converted wavelength of 266 nm if the IR wavelength is 1064 nm). In some of each of the above embodiments in this paragraph, the wavelength-converted beams include wavelengths that are one-fifth the wavelength of the amplified IR output beams (e.g., a wavelength-converted wavelength of about 400 nm if the IR wavelength is 2000 nm, or 475 nm if the IR wavelength is 2375 nm, or other suitable IR wavelength that is five times the desired wavelength-converted output wavelength). In some of each of the above embodiments in this paragraph, the wavelength-converted beams include wavelengths that are one-sixth the wavelength of the amplified IR output beams (e.g., a wavelength-converted wavelength of about 400 nm if the IR wavelength is 2400 nm, or 475 nm if the IR wavelength is 2850 nm, or other suitable IR wavelength that is six times the desired wavelength-converted output wavelength).

In some embodiments, one or more of the gain fiber(s) of each embodiment includes a single-mode fiber (SMF) or a multi-mode fiber (MMF).

In some embodiments, the present invention provides a method that includes providing a fiber gain medium; configuring an optical signal path that extends through the fiber gain medium such that the optical path forms a ring laser having a signal beam; optically pumping the fiber gain medium; forming a free-space signal beam in the optical signal path of the ring laser; Q-switching the free-space signal beam outside the fiber; and extracting, from the free-space signal beam, an intermediate optical signal output beam having a first wavelength.

Some embodiments further include forcing a majority of the signal beam to travel in a first direction around the ring laser.

Some embodiments further include wavelength filtering the signal beam to limit a linewidth of the signal beam in the ring laser.

In some embodiments, the Q-switching includes polarizing the signal beam, rotating an angle of polarization of the polarized signal beam, and again polarizing the polarization-rotated signal beam.

Some embodiments further include preferentially amplifying signal light having a first linear polarization direction in the fiber gain medium.

In some embodiments, the extracting of the intermediate optical signal output beam from the free-space signal beam includes using a polarizing beam splitter to split the free-space signal beam into the intermediate optical signal output beam and a ring-feedback signal beam.

Some embodiments further include rotating a direction of polarization of the signal beam by a non-zero amount on both of two sides of the polarizing beam splitter, wherein the non-zero amount determines proportions of the intermediate optical signal output beam and the ring-feedback signal beam.

In some embodiments, the forcing of the majority of the signal beam to travel in a first direction is performed between the two rotatings of the direction of polarization.

Some embodiments further include frequency doubling the intermediate optical signal output beam to form a second signal output beam having a second wavelength that is one-half of the first wavelength of the intermediate optical signal output beam.

Some embodiments further include forcing the signal beam to travel in a first direction around the ring laser; filtering the signal beam to limit a linewidth of the signal beam in the ring laser, wherein the Q-switching includes using a rubidium titanyl phosphate (RTP) Pockels cell; polarizing the signal beam to a linear polarization on each of two sides of the RTP Pockels cell, wherein the extracting of the intermediate optical signal output beam from the free-space signal beam includes using a polarizing beam splitter; rotating a direction of polarization by 90 degrees on both of two sides of the polarizing beam splitter, wherein the forcing of a majority of the signal beam is done between the two rotatings of the direction of polarization; and wavelength converting the intermediate optical signal output beam to a wavelength different from the first wavelength of the intermediate optical signal output beam.

Some embodiments further include forcing the signal beam to travel in a first direction around the ring laser; forming a free-space signal beam in the ring laser; filtering the signal beam to limit a linewidth of the signal beam in the ring laser; amplitude-modulating the signal beam to form pulses; polarizing the signal beam to a linear polarization; extracting the signal beam as an intermediate optical signal output beam from the free-space signal beam includes using a polarizing beam splitter; rotating a direction of polarization on both of two sides of the polarizing beam splitter, wherein the forcing of a majority of the signal beam is done between the two rotating s of the direction of polarization; and wavelength converting the intermediate optical signal output beam to a wavelength different from the first wavelength of the intermediate optical signal output beam.

In some embodiments, the present invention provides an apparatus that includes a ring laser that has an optical signal ring path and further has a signal beam that propagates in the ring laser, the ring laser including an optically-pumped gain fiber that forms a first portion of the optical signal ring path; a pump port configured to guide pump light into the gain fiber; fiber-end optics at a first end of the gain fiber and fiber-end optics at a second end of the gain fiber, the first and second fiber-end optics configured to form a free-space second portion of the optical signal ring path between the first end and the second end of the gain fiber such that a free-space signal beam propagates in the free-space second portion of the optical signal ring path; a Q-switch in the free-space second portion of the optical signal ring path; and extraction optics configured to obtain an intermediate output beam from the free-space signal beam.

Some embodiments further include a first optical component in the free-space second portion of the optical signal ring path configured to force a majority of the free-space signal beam to travel in a first direction around the ring laser.

Some embodiments further include a wavelength filter located in the free-space second portion of the optical signal ring path configured to limit a linewidth of the signal beam in the ring laser.

In some embodiments, the Q-switch includes an electrical control configured to control a timing of signal pulses.

In some embodiments, the Q-switch further comprises a Pockels cell; and a polarizer in the free-space second portion of the optical signal ring path on each of two sides of the Pockels cell to linearly polarize the signal beam on the two sides of the Pockels cell.

In some embodiments, the extraction optics include a polarizing beam splitter.

Some embodiments further include a first half-wave plate in the free-space portion of the signal beam path on a first side of the polarizing beam splitter, and a second half-wave plate in the free-space portion of the signal beam path on a first side of the polarizing beam splitter, wherein the first and second half-wave plates are adjustable to control a proportion of the free-space signal beam that is output, and to align a polarization of a ring-feedback signal beam to that of the gain fiber.

In some embodiments, the gain fiber is a polarization-maintaining (PM) gain fiber.

Some embodiments further include a wavelength-converting device optically coupled to receive the intermediate output beam and to convert a wavelength of the intermediate output beam to a wavelength different from the wavelength of the intermediate output beam.

In some embodiments, the present invention provides an apparatus that includes a fiber gain medium that is configured to form a first portion of an optical signal ring path that extends through the fiber gain medium such that the optical signal ring path forms a ring laser having a signal beam; means, as described herein, for optically pumping the fiber gain medium; means, as described herein, for forming a free-space signal beam in the optical signal ring path; means, as described herein, for Q-switching the free-space signal beam; and means, as described herein, for extracting an intermediate output beam from the free-space signal beam.

Some embodiments further include means for forcing the signal beam to travel in a first direction around the ring laser.

Some embodiments further include means for filtering the signal beam to limit a linewidth of the signal beam in the ring laser.

In some embodiments, the means for Q-switching is configured to pass light based on an electrical control signal.

Some embodiments further include a rubidium titanyl phosphate (RTP) Pockels cell; and means for polarizing the signal beam to a linear polarization on each of two sides of a RTP Pockels cell.

In some embodiments, the means for extracting of the intermediate output beam from the free-space beam includes means for polarizing beam splitter.

Some embodiments further include means for rotating a direction of polarization by 90 degrees on both of two sides of the polarizing beam splitter.

In some embodiments, the means for Q-switching includes means for passing light based on an electrical control signal, wherein the means for extracting of the intermediate output beam from the free-space beam includes means for polarizing beam splitter, wherein the gain fiber is a polarization-maintaining (PM) gain fiber, and wherein the apparatus further includes means for forcing the signal beam to travel in a first direction around the ring laser; and means for filtering the signal beam to limit a linewidth of the signal beam in the ring laser.

Some embodiments further include means for wavelength converting the intermediate output beam to a wavelength different from a wavelength of the intermediate output beam.

Some embodiments further include means for opto-isolating the signal beam to travel only in a single direction around the ring; means for filtering the signal beam to limit a linewidth of the signal beam in the ring, wherein the Q-switching includes using a rubidium titanyl phosphate (RTP) Pockels cell; means for polarizing the signal beam to a linear polarization on each of two sides of the RTP Pockels cell, wherein the extracting of the intermediate output beam from the free-space beam includes using a polarizing beam splitter; means for rotating a direction of polarization by 90 degrees on both of two sides of the polarizing beam splitter, wherein the opto-isolating of the signal beam is done between the two rotatings of the direction of polarization;

and means for wavelength converting the intermediate output beam to a wavelength different from a wavelength of the intermediate output beam.

Some embodiments of the apparatus described herein further include a materials-processing unit operably coupled to receive laser output energy from one or more of the ring-laser systems and/or wavelength-conversion devices and configured to use the laser output energy for materials-processing functions.

In some embodiments, the present invention provides a method that includes: providing a fiber gain medium; optically pumping the fiber gain medium; outputting a laser signal as an intermediate optical signal output beam having a first wavelength from the fiber gain medium; frequency quadrupling the intermediate optical signal output beam to form a frequency-quadrupled optical signal; and transmitting the frequency-quadrupled optical signal through water, such as seawater. Some embodiments further include encoding the laser signal with data to be communicated through the water. In some such embodiments, the transmitting of the signal is between two ships, at least one of which is a submarine.

Some embodiments further include detecting a light signal caused by light interaction of the frequency-quadrupled signal with a thermocline in the water; and processing the detected light signal to derive image information. Some embodiments further include displaying the image information on a monitor.

Some embodiments further include pulsing the laser signal; detecting a light signal from one or more light interactions of the incident frequency-quadrupled signal with anomalies in the water (e.g., scattering, reflections, dispersion and/or the like); and processing the detected light signal to derive image information. In some such embodiments, the transmitting of the frequency-quadrupled signal further includes scanning the transmitted frequency-quadrupled signal across a range of angles in order to detect three-dimensional (3D) image information. Some embodiments further include displaying the 3D image information on a 3D monitor. In some such embodiments, the 3D monitor includes a head-mounted visual-display device for a person, the display having separate displays for each eye of the person. In some embodiments, the 3D monitor includes a large-screen LCD screen that alternates display frames for the left eye of a viewer with display frames for the right eye of the viewer, as is well known in the art. In some embodiments, the 3D monitor includes a large-screen LCD screen that presents display frames for the left eye of a viewer with a first polarization and simultaneously presents frames for the right eye of the viewer with a different second polarization, such that the 3D information can be viewed by a plurality of persons using polarized optics (e.g., polarized glasses having a vertical polarization over the left eye and horizontal polarization over the right eye (or vice versa)).

In some embodiments, the frequency quadrupling of the intermediate optical signal output beam further includes: frequency doubling the intermediate optical signal output beam to form a second optical signal output beam having a second wavelength that is one-half of the first wavelength of the intermediate optical signal output beam; and frequency doubling the second optical signal output beam to form the frequency-quadrupled optical signal beam having a third wavelength that is one-half of the second wavelength of the second optical signal output beam.

In some embodiments, the fiber gain medium is arranged as a ring laser, and the method further includes forcing the signal beam to travel in a first direction around the ring laser; forming a free-space signal beam in the ring laser; filtering the signal beam to limit a linewidth of the signal beam in the ring laser; Q-switching the signal using a rubidium titanyl phosphate (RTP) Pockels cell; polarizing the signal beam to a linear polarization on each of two sides of the RTP Pockels cell; extracting the laser signal as an intermediate optical signal output beam from the free-space signal beam includes using a polarizing beam splitter; rotating a direction of polarization by 90 degrees on both of two sides of the polarizing beam splitter, wherein the forcing of a majority of the signal beam is done between the two rotatings of the direction of polarization; and wavelength converting the intermediate optical signal output beam to a wavelength different from the first wavelength of the intermediate optical signal output beam.

In some embodiments, the fiber gain medium is arranged as a ring laser, and the method further includes forcing the signal beam to travel in a first direction around the ring laser; forming a free-space signal beam in the ring laser; filtering the signal beam to limit a linewidth of the signal beam in the ring laser; amplitude-modulating the signal beam to form pulses; polarizing the signal beam to a linear polarization; extracting the signal beam as an intermediate optical signal output beam from the free-space signal beam includes using a polarizing beam splitter; rotating a direction of polarization on both of two sides of the polarizing beam splitter, wherein the forcing of a majority of the signal beam is done between the two rotatings of the direction of polarization; and wavelength converting the intermediate optical signal output beam to a wavelength different from the first wavelength of the intermediate optical signal output beam.

Some embodiments further include using the frequency-quadrupled output beam for communications through seawater. In some embodiments, the transmitting of the frequency-quadrupled optical signal is performed from a surface vehicle. In some embodiments, the transmitting of the frequency-quadrupled optical signal is performed from an aircraft. In some such embodiments the aircraft is an unmanned aerial vehicle (UAV). In some embodiments, the transmitting of the frequency-quadrupled optical signal is performed from a satellite or other platform located at least 100 kilometers from a water surface. In some embodiments, the transmitting of the frequency-quadrupled optical signal is performed from a satellite or other platform located at least 200 kilometers from a water surface. In some embodiments, the transmitting of the frequency-quadrupled optical signal is performed from a satellite or other platform located at least 300 kilometers from a water surface. In some embodiments, the transmitting of the frequency-quadrupled optical signal is performed from an underwater stationary device tethered to a sea bottom. In some embodiments, the transmitting of the frequency-quadrupled optical signal is performed from a floating buoy. In some embodiments, the transmitting of the frequency-quadrupled optical signal is performed from a manned underwater vehicle such as a submarine. In some embodiments, the transmitting of the frequency-quadrupled optical signal is performed from an unmanned underwater vehicle (UUV).

Some embodiments further include using the frequency-quadrupled output beam for imaging through seawater.

Some embodiments further include using the frequency-quadrupled output beam to illuminate underwater features; and detecting and processing reflected light from the frequency-quadrupled output beam to form image data. In some embodiments, the method further includes displaying the image data on a monitor.

Some embodiments further include using the frequency-quadrupled output beam for detection and ranging of underwater bodies, including submarines or other underwater vehicles, fish, or marine mammals. This is also called light distancing and ranging (LIDAR). In some embodiments, this is done from an aircraft, surface vessel, or submerged vessel.

In some embodiments, the present invention provides an apparatus that includes a high-power infrared laser outputting a laser signal having a first wavelength between 1800 nm and 2000 nm as an intermediate optical signal output beam; a data encoder operably coupled to encode data on the intermediate optical signal output beam; a frequency quadrupler operably coupled to receive the encoded intermediate optical signal output beam and to form a frequency-quadrupled optical signal; and a beam transmitter operably coupled to transmit the frequency-quadrupled optical signal through water. In other embodiments, the data encoder is instead configured to encode data on a frequency-doubled beam obtained by frequency doubling the intermediate optical signal output beam before the data is imposed on the beam. In other embodiments, the data encoder is instead configured to encode data on a frequency-quadrupled beam obtained by frequency doubling and frequency doubling again the intermediate optical signal output beam before the data is imposed on the beam. In some embodiments, the initial (e.g., Tm-doped) fiber laser used to generate the intermediate IR signal uses a master-oscillator power-amplifier (MOPA) configuration that uses a seed laser beam from a semiconductor laser that is amplified by one or more Tm-doped fiber amplifiers. In other embodiments, the initial laser (or the seed laser if the initial laser uses a MOPA configuration) is a Q-switched or cavity-dumped ring fiber laser. In yet other embodiments, the seed source includes a distributed feedback (DFB) laser diode, a distributed Bragg reflector (DBR) diode, or a laser diode externally stabilized with a fiber Bragg grating or with a volume Bragg grating.

In some embodiments, the present invention provides an apparatus that includes a high-power infrared laser outputting a laser signal having a first wavelength between 1800 nm and 2000 nm as an intermediate optical signal output beam; a pulse generator or a pulse modulator operably coupled to pulse the intermediate optical signal output beam; a frequency quadrupler operably coupled to receive the pulsed intermediate optical signal output beam and to form a frequency-quadrupled optical signal; a beam transmitter operably coupled to transmit the frequency-quadrupled optical signal through water; and a light detector and processor configured to detect and process a sensed light signal from light interactions of the incident light signal with anomalies in the water (e.g., scattering, reflections or the like) from the transmitted frequency-quadrupled optical signal, to generate 3D image data.

In some embodiments, the present invention provides an apparatus that includes a fiber gain medium; means for optically pumping the fiber gain medium; means for outputting a laser signal as an intermediate optical signal output beam having a first wavelength from the fiber gain medium; means for frequency quadrupling the intermediate optical signal output beam to form a frequency-quadrupled optical signal; and means for transmitting the frequency-quadrupled optical signal.

Some embodiments further include means for encoding the laser signal with data to be communicated through the water.

In some embodiments, the means for transmitting of the signal is arranged to communicate data between two ships, at least one of which is a submarine.

Some embodiments further include means for pulsing the laser signal; means for detecting, from the water, a light signal caused by light interaction of the frequency-quadrupled signal; and means for processing the detected light signal to derive image information. In some such embodiments, the means for transmitting the frequency-quadrupled signal further includes means for scanning the transmitted frequency-quadrupled signal across a range of angles in order to detect three-dimensional (3D) image information.

In some embodiments, the means for frequency quadrupling the intermediate optical signal output beam further includes means for frequency doubling the intermediate optical signal output beam to form a second optical signal output beam having a second wavelength that is one-half of the first wavelength of the intermediate optical signal output beam; and means for frequency doubling the second optical signal output beam to form the frequency-quadrupled optical signal beam having a third wavelength that is one-half of the second wavelength of the second optical signal output beam.

In some embodiments, the fiber gain medium is arranged as a ring laser, the apparatus further comprising means for forcing the signal beam to travel in a first direction around the ring laser; means for forming a free-space signal beam in the ring laser; means for filtering the signal beam to limit a linewidth of the signal beam in the ring laser; means for amplitude-modulating the signal; polarizing the signal beam to a linear polarization; means for extracting the signal beam as an intermediate optical signal output beam from the free-space signal beam includes using a polarizing beam splitter; means for rotating a direction of polarization on both of two sides of the polarizing beam splitter, wherein the forcing of a majority of the signal beam is done between the two rotatings of the direction of polarization; and means for wavelength converting the intermediate optical signal output beam to a wavelength different from the first wavelength of the intermediate optical signal output beam.

Some embodiments further include means for communicating through seawater using the frequency-quadrupled output beam. In some such embodiments, the means for transmitting the frequency-quadrupled optical signal operates from a surface vehicle. In some embodiments, the means for transmitting the frequency-quadrupled optical signal operates from an aircraft. In some embodiments, the means for transmitting the frequency-quadrupled optical signal operates from a satellite located at least 100 kilometers from a water surface. In some embodiments, the means for transmitting the frequency-quadrupled optical signal operates from an underwater stationary device tethered to a sea bottom. In some embodiments, the means for transmitting the frequency-quadrupled optical signal operates from a floating buoy. In some embodiments, the means for transmitting the frequency-quadrupled optical signal operates from a manned underwater vehicle. In some embodiments, the means for transmitting the frequency-quadrupled optical signal operates from an unmanned underwater vehicle (UUV).

Some embodiments further include means for imaging through seawater using the frequency-quadrupled output beam.

Some embodiments further include means for illuminating underwater features using the frequency-quadrupled output beam; and means for detecting and processing reflected light from the frequency-quadrupled output beam to form an image.

Some embodiments further include for detection and ranging of underwater bodies using the frequency-quadrupled output beam.

Some embodiments further include means for imaging disturbances in the thermocline using the frequency-quadrupled output beam.

As used herein, the term "light interaction" includes any change in the direction, wavelength, phase, spectrum, dispersion, polarization, intensity, and/or other physical property of a propagating light signal—it includes both static and dynamic scattering of an incident light signal due to any anomaly (including atoms, molecules, changes in index of refraction (such as might be caused by a thermocline (the region of relatively abrupt temperature change that resides between the upper mixed layer of water above and the deep ocean water below) or halocline (abrupt change in salinity)), microscopic life or inanimate dust particles, or by macroscopic bodies such as fish, mammals, arthropods and the like, by underwater objects or underwater vehicles such as a submarine, or by the underwater landscape such as sand or underwater mountains on the sea bottom). Because it includes any change in the direction of a propagating light signal, the term "light interaction" as used herein includes what might otherwise be called "reflection." Because it also includes any change in the wavelength, phase, spectrum or polarization of a propagating light signal, the term "light interaction" as used herein includes what might otherwise be called "fluorescence," "changes in the apparent distance of propagation," "absorption" (such as by atomic or molecular species that selectively absorb more or less of various incident wavelengths), "changes in polarization" or other linear or non-linear effect on the light signal. These changes arise from (1) the spatial-coherence properties of the incident light, (2) the frequency dependence of the potential (due to dispersion of the medium) and (3) frequency dependence of the free-space Green function (see Emil Wolf, "Theory of Coherence and Polarization of light," Cambridge University Press, New York (2007) pages 111-128, which is incorporated herein by reference). The detection of a light interaction can be by a light sensor that is located close to the light source (e.g., for detecting reflections or scattering of the light signal (or of a wavelength or polarization change to the light signal) back toward its source), or by a light sensor that is located off to a side of the direction of propagation of the incident light source (for detecting reflections or scattering (or of a wavelength or polarization change to the light signal) of the light signal in a direction other than back toward its source or toward the same direction as the initial direction of the light signal), or by a light sensor located distal and in the same direction as the initial direction of the light signal (for detecting changes to intensity, wavelength or polarization due to objects located along a straight line between the source and the sensor).

As used herein, an "anomaly in the water" means any change in the presence or relative abundances of atoms or molecules, changes in index of refraction (such as might be caused by a thermocline or abrupt change in salinity), microscopic life or inanimate dust particles, or by macroscopic bodies such as fish, mammals, arthropods and the like, by underwater objects or underwater vehicles such as a submarine, or by the underwater landscape such as sand or underwater mountains on the sea bottom). In some embodiments, the light interaction of the signal beam with the water surface (a surface signal due, e.g., to reflection or scattering) provides a reference signal (e.g., time-of-flight) from which other interactions with anomalies in the water (submarines, disturbances to the thermocline, halocline, sea bottom, or other anomalies) are measured with reference to. In some embodiments, this surface signal is subtracted from other received light-interaction signal to obtain an improved signal-to-noise ratio of the signal used to derive image data. In some embodiments, the time-of-flight differences between the various intensity (or wavelength, phase, spectrum, or polarization) features of the sensed signal from the light interaction of the incident light with the various anomalies in the water are used to generate three-dimensional image data, which can then be either automatically analyzed to detect an object of interest (such as a submarine), or displayed in various forms (e.g., false color, contour lines, or a rotatable image with simulated reflection or shading to show surfaces or interfaces, or other convenient form for visual interpretation by a human user).

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first, " "second," and "third," etc., are used merely as labels, and are not intended to impose numerical requirements on their objects.

What is claimed is:

1. An apparatus comprising:
an infrared laser outputting a laser signal having a first wavelength between 1800 nm and 2000 nm as an intermediate optical signal output beam;
a frequency quadrupler operably coupled to receive the intermediate optical signal output beam and to output a frequency-quadrupled optical signal;
a beam polarizer configured to orient a polarization direction of the frequency-quadrupled optical signal in a direction that enhances transmission through an air-water interface;
a beam transmitter operably coupled to transmit the polarized frequency-quadrupled optical signal through water;
a light detector and processor configured to detect and process reflections from the transmitted frequency-quadrupled optical signal to generate image data, wherein the light detector includes a narrowband light filter configured to increase a signal-to-noise ratio of the detected reflections.

2. The apparatus of claim 1, further comprising: a data encoder operably coupled to encode data on at least one of the intermediate optical signal output beam and the frequency-quadrupled optical signal such that the frequency-quadrupled optical signal has encoded data.

3. The apparatus of claim 1, wherein the infrared laser includes a large-mode-area (LMA) fiber.

4. The apparatus of claim 1, wherein the narrowband light filter includes a polarization beamsplitter configured to obtain a plurality of received signals from different polarizations obtained from the beamsplitter including a first polarization signal and a second polarization signal, wherein the processor is further configured to process the first polarization signal.

5. The apparatus of claim 4, wherein the processor is further configured to subtract the second polarization signal from the first polarization signal to enhance a signal-to-noise ratio of the processed received signals.

6. An apparatus comprising:
a fiber gain medium;
means for optically pumping the fiber gain medium;
means for generating a laser seed signal;
means for optically coupling, into the fiber gain medium, the laser seed signal;
means for outputting, from the fiber gain medium, an amplified version of the laser seed signal as an intermediate optical signal output beam having a first wavelength between 1800 nm and 2000 nm;
means for frequency quadrupling the intermediate optical signal output beam to form a frequency-quadrupled optical signal;
means for orienting a polarization direction of the frequency-quadrupled optical signal in a direction that enhances transmission through an air-water interface;
means for transmitting the frequency-quadrupled optical signal through seawater; and
means for detecting, from water, a light signal caused by light interaction of the frequency-quadrupled signal; and means for processing the detected light signal to derive image information.

7. The apparatus of claim 6, wherein the means for transmitting the frequency-quadrupled optical signal is arranged to communicate data between two ships, at least one of which is a submarine.

8. The apparatus of claim 6, wherein the means for transmitting the frequency-quadrupled signal further includes means for scanning the transmitted frequency-quadrupled signal across a range of angles in order to detect three-dimensional (3D) image information.

9. The apparatus of claim 6, wherein the means for frequency quadrupling the intermediate optical signal output beam further includes: means for frequency doubling the intermediate optical signal output beam to form a second optical signal output beam having a second wavelength that is one-half of the first wavelength of the intermediate optical signal output beam; and means for frequency doubling the second optical signal output beam to form the frequency-quadrupled optical signal having a third wavelength that is one-half of the second wavelength of the second optical signal output beam.

10. The apparatus of claim 6, wherein the means for transmitting the frequency-quadrupled optical signal operates from a surface vehicle.

11. The apparatus of claim 6, wherein the means for transmitting the frequency-quadrupled optical signal operates from an aircraft.

12. The apparatus of claim 6, further comprising: means for illuminating underwater features using the frequency-quadrupled optical signal; and means for detecting and processing reflected light from the frequency-quadrupled optical signal to form an image.

13. A method comprising:
providing a fiber gain medium;
optically pumping the fiber gain medium;
generating a laser seed signal;
optically coupling, into the fiber gain medium, the laser seed signal;
outputting, from the fiber gain medium, an amplified version of the laser seed signal as an intermediate optical signal output beam having a first wavelength between 1800 nm and 2000 nm;
frequency quadrupling the intermediate optical signal output beam to form a frequency-quadrupled optical signal;
orienting a polarization direction of the frequency-quadrupled optical signal in a direction that enhances transmission through an air-water interface;
transmitting the frequency-quadrupled optical signal through water; and
detecting a light signal caused by light interaction of the frequency-quadrupled signal with an anomaly in the water; and processing the detected light signal to derive image information.

14. The method of claim 13, further comprising: encoding the laser signal with data to be communicated through the water.

15. The method of claim 14, wherein the transmitting of the signal is between two ships, at least one of which is a submarine.

16. The method of claim 13, further comprising: detecting a light signal caused by light interaction of the frequency-quadrupled signal with a thermocline in the water; and processing the detected light signal to derive image information.

17. The method of claim 13, wherein the transmitting of the frequency-quadrupled signal further includes scanning the transmitted frequency-quadrupled signal across a range of angles in order to detect three-dimensional (3D) image information.

18. The method of claim 13, wherein the frequency quadrupling of the intermediate optical signal output beam further includes: frequency doubling the intermediate optical signal output beam to form a second optical signal output beam having a second wavelength that is one-half of the first wavelength of the intermediate optical signal output beam; and frequency doubling the second optical signal output beam to form the frequency-quadrupled optical signal beam having a third wavelength that is one-half of the second wavelength of the second optical signal output beam.

19. The method of claim 13, wherein the transmitting of the frequency-quadrupled optical signal includes steering a majority of the frequency-quadrupled optical signal toward a desired target receiver.

20. The method of claim 13, wherein the frequency-quadrupled optical signal has a wavelength that is set to a wavelength of Fraunhofer feature F.

* * * * *